US012651224B2

(12) United States Patent
Gerlach

(10) Patent No.: US 12,651,224 B2
(45) Date of Patent: Jun. 9, 2026

(54) INTELLIGENT EXPLANATION OF CONFIGURATION KEYS

(71) Applicant: SAP SE, Walldorf (DE)

(72) Inventor: Torsten Gerlach, Nussloch (DE)

(73) Assignee: SAP SE, Walldorf (DE)

( * ) Notice: Subject to any disclaimer, the term of this patent is extended or adjusted under 35 U.S.C. 154(b) by 14 days.

(21) Appl. No.: 18/745,560

(22) Filed: Jun. 17, 2024

(65) Prior Publication Data

US 2025/0307744 A1      Oct. 2, 2025

Related U.S. Application Data

(60) Provisional application No. 63/570,668, filed on Mar. 27, 2024.

(51) Int. Cl.
  *G06Q 10/0633*      (2023.01)
(52) U.S. Cl.
  CPC ...  *G06Q 10/0633* (2013.01); *G06Q 10/06332* (2025.08)
(58) Field of Classification Search
  CPC ..................... G06Q 10/0633; G06Q 10/06332
  See application file for complete search history.

(56) References Cited

U.S. PATENT DOCUMENTS

2021/0042638 A1* 2/2021 Novotny ................ G06N 20/00
2023/0110941 A1* 4/2023 Makhija ................ G06F 40/284
                                              709/224

2024/0134874 A1* 4/2024 Blonski ............... G06F 3/04842
2025/0028586 A1* 1/2025 Subramanian .......... G06F 9/547
2025/0238433 A1* 7/2025 Sussman ............... G06Q 10/10
2025/0259047 A1* 8/2025 Crabtree ............... G06N 5/022
2025/0272652 A1* 8/2025 Makhija ............... G06F 40/205
2025/0285121 A1* 9/2025 Chen ..................... G06N 20/00

OTHER PUBLICATIONS

Marko, Korhonen. "Applying generative ai and large language models in business applications." (2023). (Year: 2023).*
Garg, Anshumaan, and Dolly Sharma. "Generative AI for software test modelling with a focus on ERP software." 2023 International Conference on Advances in Computation, Communication and Information Technology (ICAICCIT). IEEE, 2023. (Year: 2023).*

(Continued)

*Primary Examiner* — Andre D Boyce
(74) *Attorney, Agent, or Firm* — Klarquist Sparkman, LLP

(57)      ABSTRACT

A computer-implemented method receives a request to explain a configuration key which represents a set of rules for controlling a process flow of an entity of an enterprise resource planning (ERP) system, the set of rules defining a data operation scheme based on a plurality of tables stored in a database of the ERP system. The method generates a data object from the plurality of tables, the data object including a group of key-value pairs which collectively define the set of rules, preserving the hierarchy of the involved tables. The method generates a prompt based on the data object generated from the plurality of tables, prompts a large language model using the prompt, receives a response from the large language model, and based on the response, outputs an explanation of the configuration key summarizing the set of rules in natural language. Related computing system and software are also disclosed.

20 Claims, 14 Drawing Sheets

(56) References Cited

OTHER PUBLICATIONS

GeeksforGeeks, "What is SAP ABAP Data Dictionary (DDIC)?," https://www.geeksforgeeks.org/what-is-sap-abap-data-dictionary-ddic/, 14 pages (accessed May 16, 2024).

Skillstek, "What is Depreciation Calculation in SAP?," https://skillstek.com/methods-of-depreciation-calculation-in-sap/, 11 pages (accessed May 14, 2024).

LeanX, "SAP Table T090NA, Depreciation Keys," https://leanx.eu/en/sap/table/t090na.html, 3 pages (accessed May 10, 2024).

SAP Community, https://community.sap.com/t5/enterprise-resource-planning-q-a/table-for-dep-keys-and-assigned-calculation-methods-reg/qaq-p/8505833, 7 pages (accessed May 10, 2024).

SAP, "Asset Accounting," https://help.sap.com/docs/SAP_S4HANA_CLOUD/3e5fef2c768746049b5627bd5a42f720?locale=en-US&state=PRODUCTION&version=2402.502, 30 pages (accessed May 11, 2024).

* cited by examiner

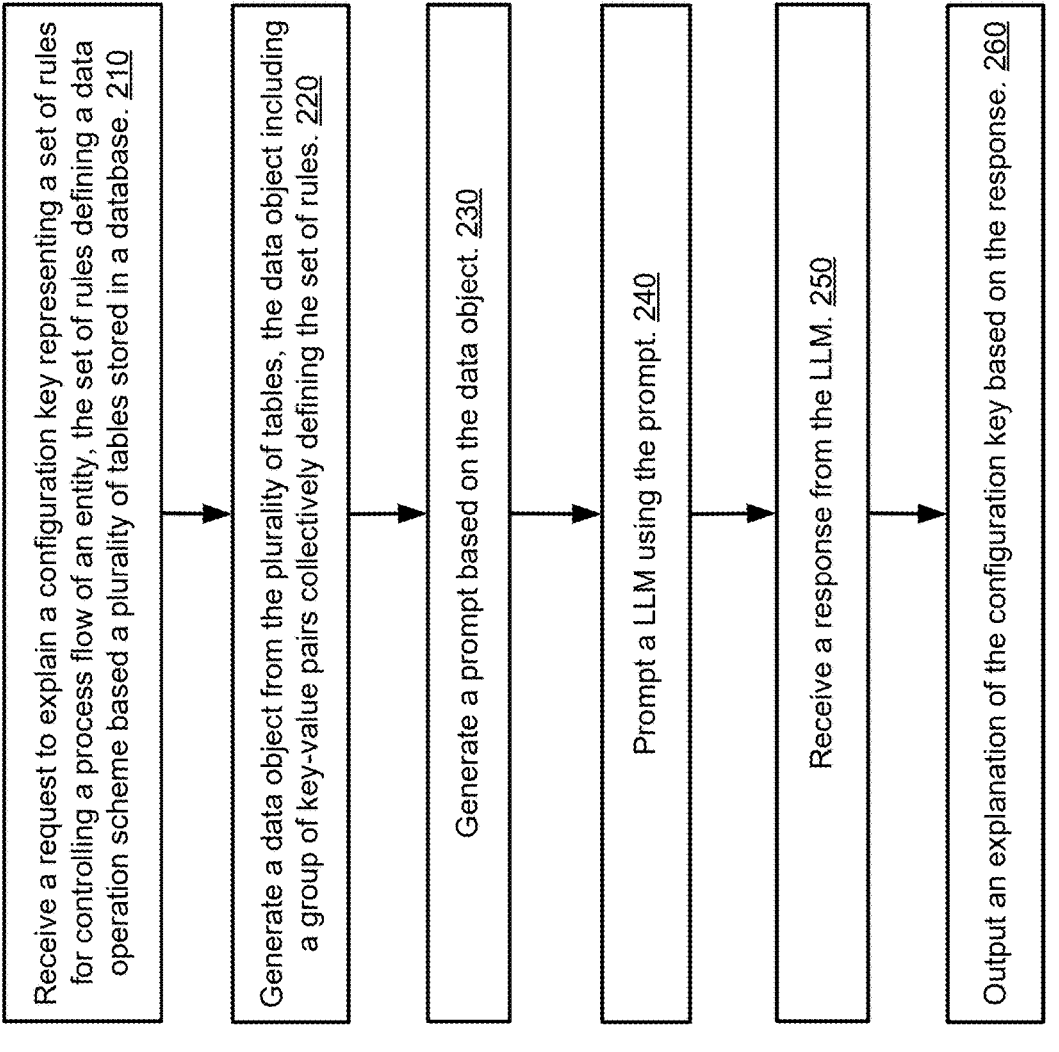

Receive a request to explain a configuration key representing a set of rules for controlling a process flow of an entity, the set of rules defining a data operation scheme based a plurality of tables stored in a database. 210

Generate a data object from the plurality of tables, the data object including a group of key-value pairs collectively defining the set of rules. 220

Generate a prompt based on the data object. 230

Prompt a LLM using the prompt. 240

Receive a response from the LLM. 250

Output an explanation of the configuration key based on the response. 260

Figure 6:
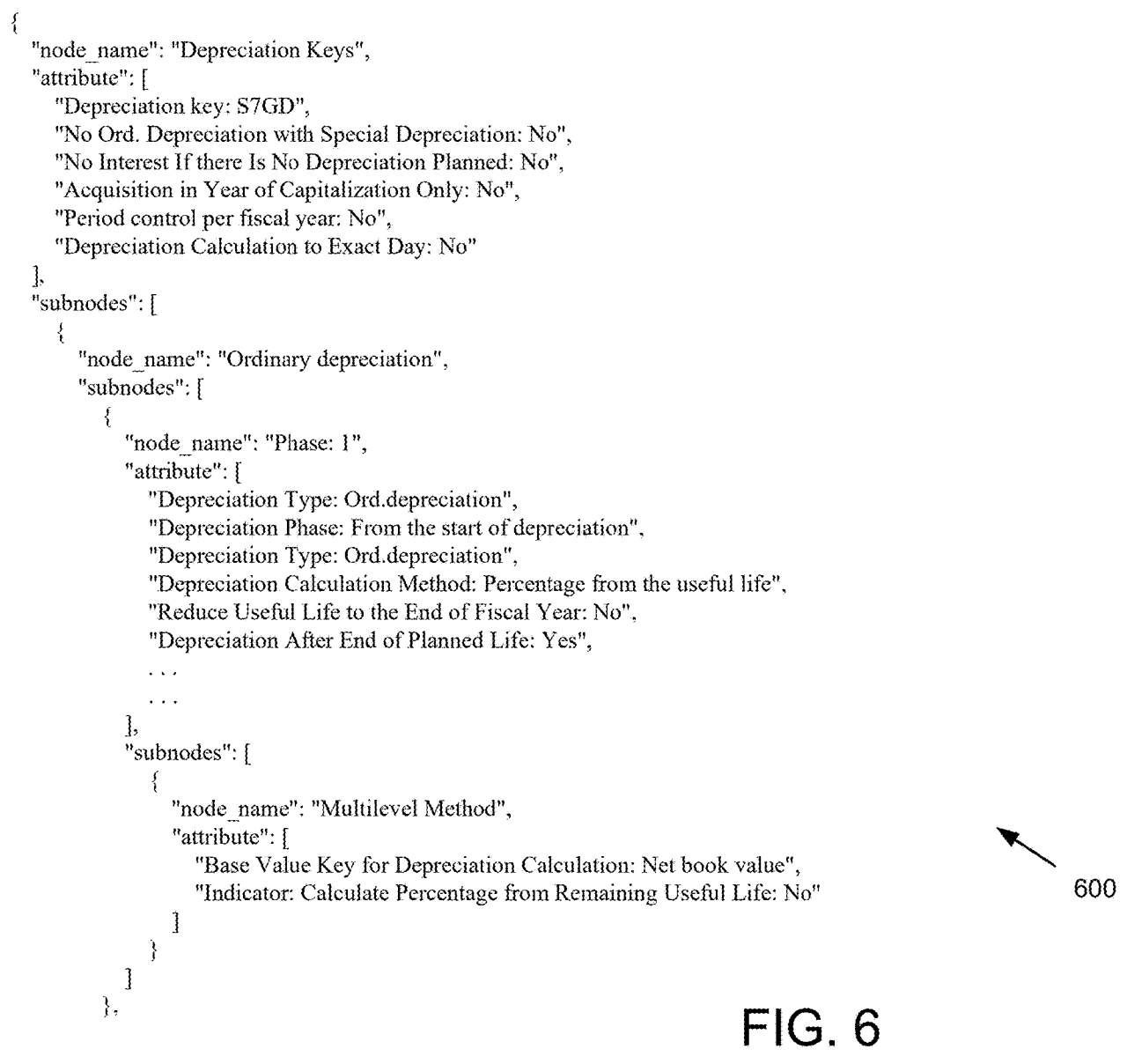

```
{
  "node_name": "Depreciation Keys",
  "attribute": [
    "Depreciation key: S7GiD",
    "No Ord. Depreciation with Special Depreciation: No",
    "No Interest If there Is No Depreciation Planned: No",
    "Acquisition in Year of Capitalization Only: No",
    "Period control per fiscal year: No",
    "Depreciation Calculation to Exact Day: No"
  ],
  "subnodes": [
    {
      "node_name": "Ordinary depreciation",
      "subnodes": [
        {
          "node_name": "Phase: 1",
          "attribute": [
            "Depreciation Type: Ord.depreciation",
            "Depreciation Phase: From the start of depreciation",
            "Depreciation Type: Ord.depreciation",
            "Depreciation Calculation Method: Percentage from the useful life",
            "Reduce Useful Life to the End of Fiscal Year: No",
            "Depreciation After End of Planned Life: Yes",
            ...
            ...
          ],
          "subnodes": [
            {
              "node_name": "Multilevel Method",
              "attribute": [
                "Base Value Key for Depreciation Calculation: Net book value",
                "Indicator: Calculate Percentage from Remaining Useful Life: No"
              ]
            }
          ]
        }
      ]
    }
  ]
}
```

Figure 7:
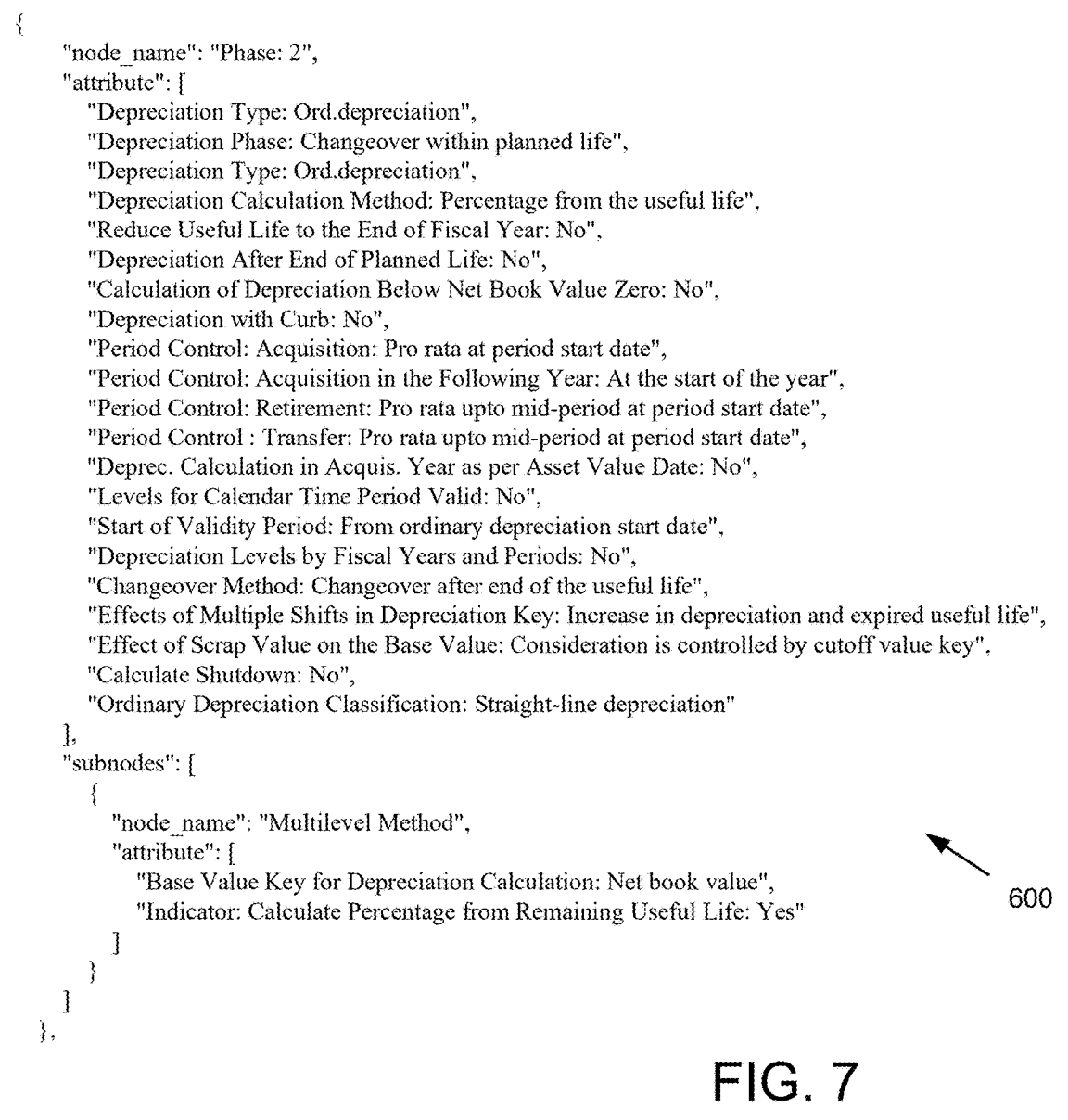

```
"node_name": "Phase: 2",
"attribute": [
    "Depreciation Type: Ord.depreciation",
    "Depreciation Phase: Changeover within planned life",
    "Depreciation Type: Ord.depreciation",
    "Depreciation Calculation Method: Percentage from the useful life",
    "Reduce Useful Life to the End of Fiscal Year: No",
    "Depreciation After End of Planned Life: No",
    "Calculation of Depreciation Below Net Book Value Zero: No",
    "Depreciation with Curb: No",
    "Period Control: Acquisition: Pro rata at period start date",
    "Period Control: Acquisition in the Following Year: At the start of the year",
    "Period Control: Retirement: Pro rata upto mid-period at period start date",
    "Period Control : Transfer: Pro rata upto mid-period at period start date",
    "Deprec. Calculation in Acquis. Year as per Asset Value Date: No",
    "Levels for Calendar Time Period Valid: No",
    "Start of Validity Period: From ordinary depreciation start date",
    "Depreciation Levels by Fiscal Years and Periods: No",
    "Changeover Method: Changeover after end of the useful life",
    "Effects of Multiple Shifts in Depreciation Key: Increase in depreciation and expired useful life",
    "Effect of Scrap Value on the Base Value: Consideration is controlled by cutoff value key",
    "Calculate Shutdown: No",
    "Ordinary Depreciation Classification: Straight-line depreciation"
],
"subnodes": [
    {
        "node_name": "Multilevel Method",
        "attribute": [
            "Base Value Key for Depreciation Calculation: Net book value",
            "Indicator: Calculate Percentage from Remaining Useful Life: Yes"
        ]
    }
]
```

Figure 8:
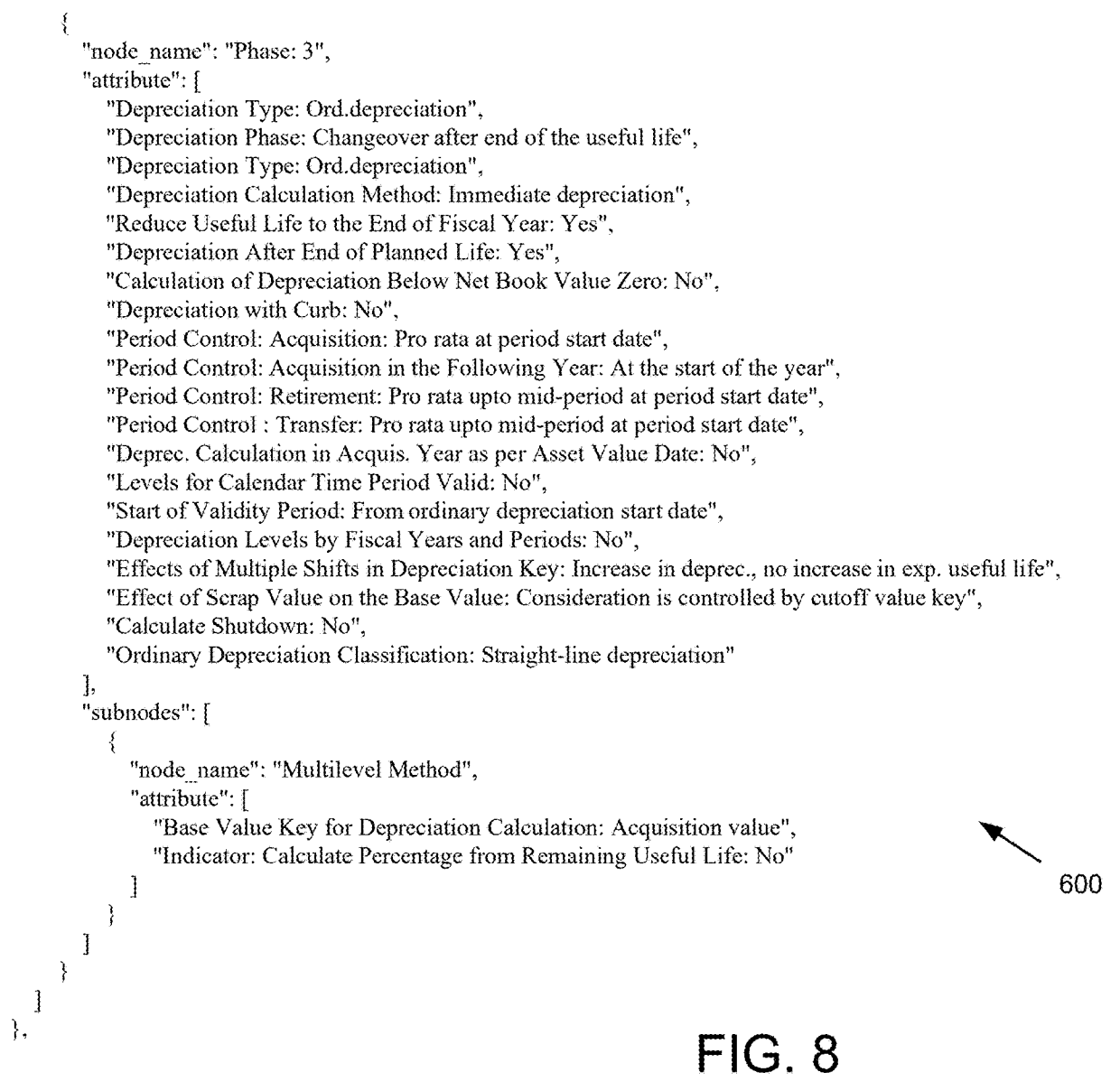

```
"node_name": "Phase: 3",
"attribute": [

"Depreciation Type: Ord.depreciation",
    "Depreciation Phase: Changeover after end of the useful life",
    "Depreciation Type: Ord.depreciation",
    "Depreciation Calculation Method: Immediate depreciation",
    "Reduce Useful Life to the End of Fiscal Year: Yes",
    "Depreciation After End of Planned Life: Yes",
    "Calculation of Depreciation Below Net Book Value Zero: No",
    "Depreciation with Curb: No",
    "Period Control: Acquisition: Pro rata at period start date",
    "Period Control: Acquisition in the Following Year: At the start of the year",
    "Period Control: Retirement: Pro rata upto mid-period at period start date",
    "Period Control : Transfer: Pro rata upto mid-period at period start date",
    "Deprec. Calculation in Acquis. Year as per Asset Value Date: No",
    "Levels for Calendar Time Period Valid: No",
    "Start of Validity Period: From ordinary depreciation start date",
    "Depreciation Levels by Fiscal Years and Periods: No",
    "Effects of Multiple Shifts in Depreciation Key: Increase in deprec., no increase in exp. useful life",
    "Effect of Scrap Value on the Base Value: Consideration is controlled by cutoff value key",
    "Calculate Shutdown: No",
    "Ordinary Depreciation Classification: Straight-line depreciation"
],
"subnodes": [

"node_name": "Multilevel Method",
    "attribute": [
        "Base Value Key for Depreciation Calculation: Acquisition value",
        "Indicator: Calculate Percentage from Remaining Useful Life: No"
    ]
]
```

Figure 9:
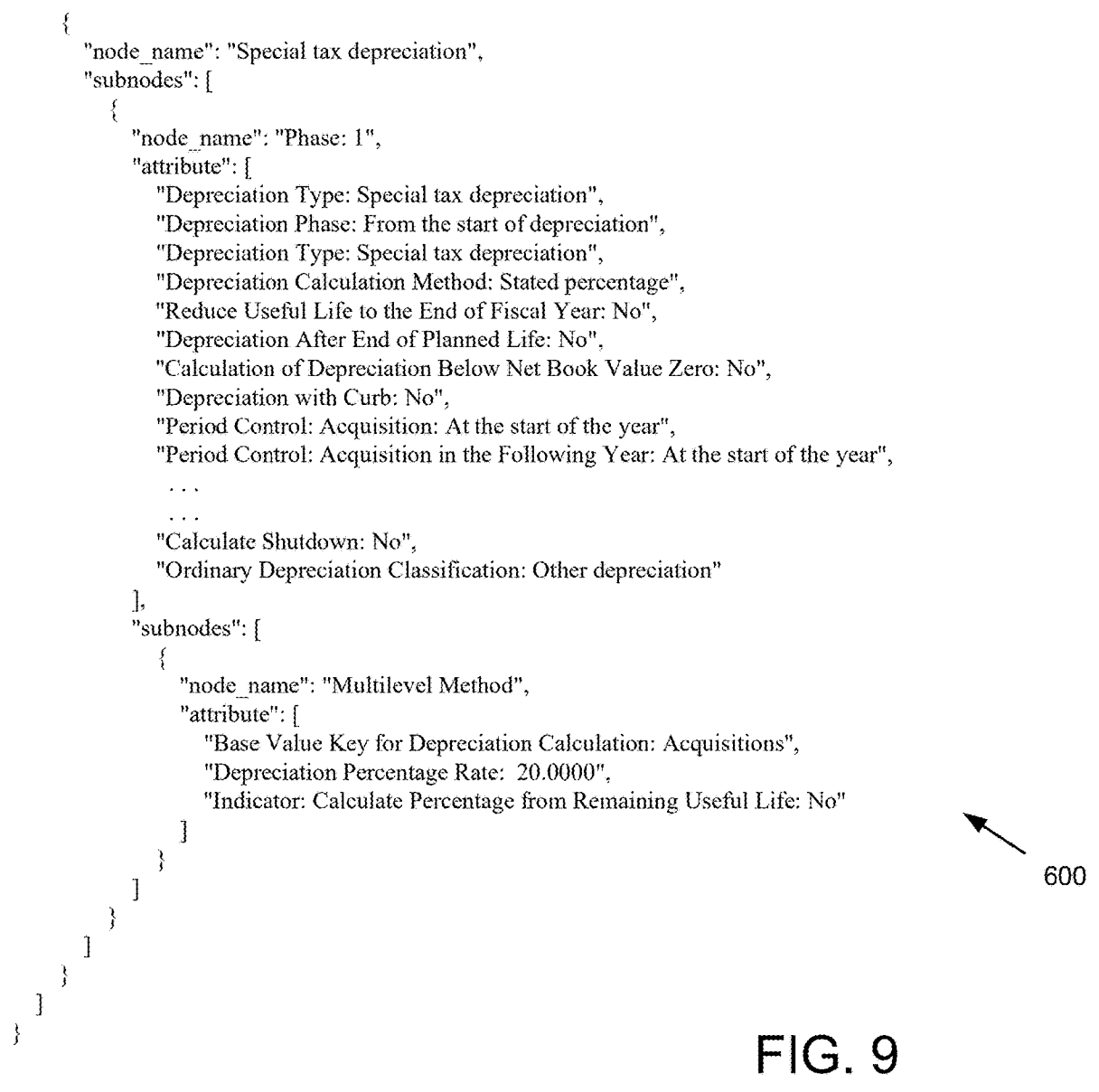

```
{
  "node_name": "Special tax depreciation",
  "subnodes": [
    {
      "node_name": "Phase: 1",
      "attribute": [
        "Depreciation Type: Special tax depreciation",
        "Depreciation Phase: From the start of depreciation",
        "Depreciation Type: Special tax depreciation",
        "Depreciation Calculation Method: Stated percentage",
        "Reduce Useful Life to the End of Fiscal Year: No",
        "Depreciation After End of Planned Life: No",
        "Calculation of Depreciation Below Net Book Value Zero: No",
        "Depreciation with Curb: No",
        "Period Control: Acquisition: At the start of the year",
        "Period Control: Acquisition in the Following Year: At the start of the year",
        . . .
        "Calculate Shutdown: No",
        "Ordinary Depreciation Classification: Other depreciation"
      ],
      "subnodes": [
        {
          "node_name": "Multilevel Method",
          "attribute": [
            "Base Value Key for Depreciation Calculation: Acquisitions",
            "Depreciation Percentage Rate: 20.0000",
            "Indicator: Calculate Percentage from Remaining Useful Life: No"
          ]
```

Figure 11:
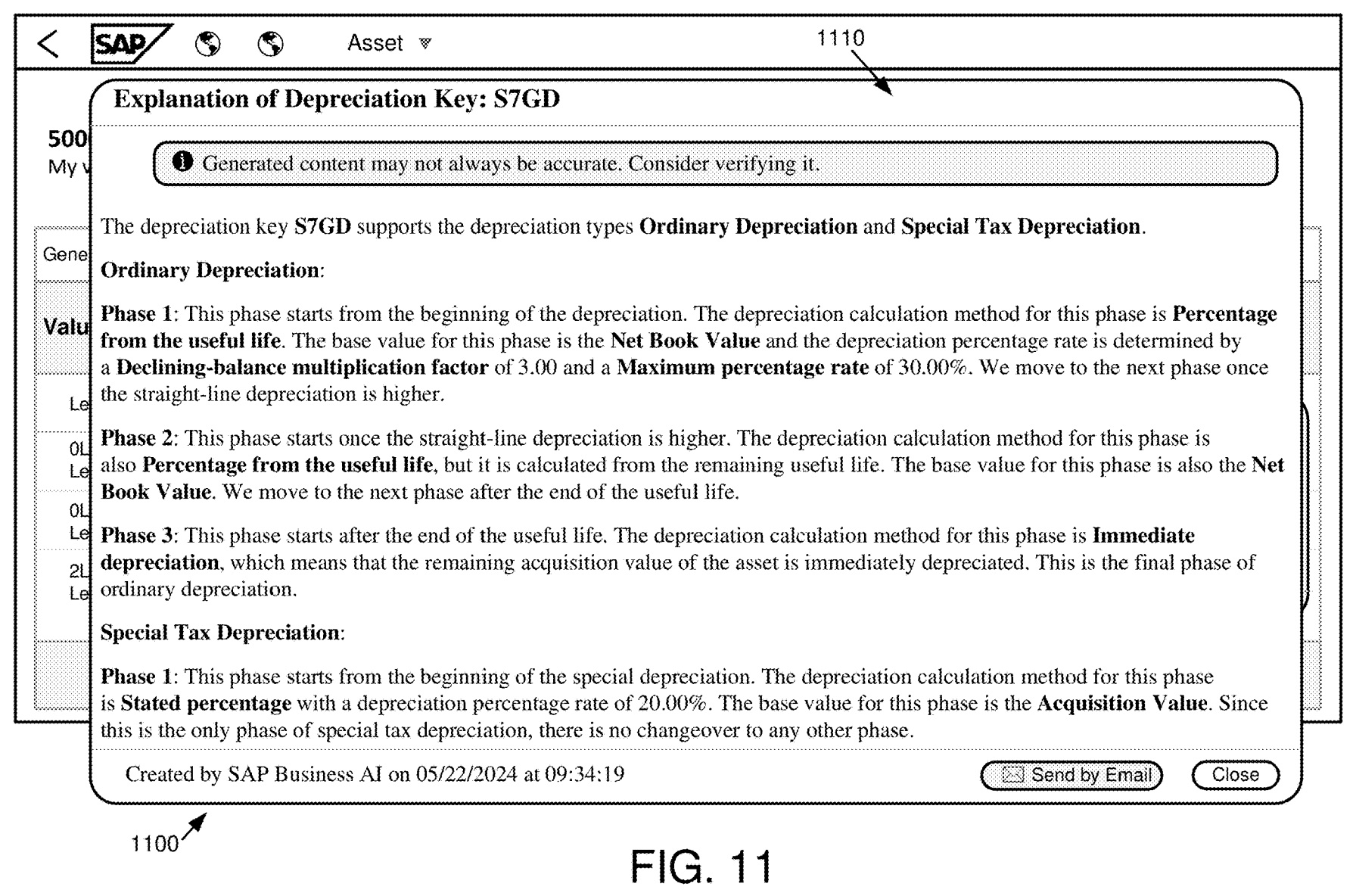

✕    Asset ▾    1110

500
My ↳

Gene

Valu

Le

0L
Le

0L
Le

2L
Le

Explanation of Depreciation Key: S7GD

ⓘ Generated content may not always be accurate. Consider verifying it.

The depreciation key S7GD supports the depreciation types Ordinary Depreciation and Special Tax Depreciation.

Ordinary Depreciation:

Phase 1: This phase starts from the beginning of the depreciation. The depreciation calculation method for this phase is Percentage from the useful life. The base value for this phase is the Net Book Value and the depreciation percentage rate is determined by a Declining-balance multiplication factor of 3.00 and a Maximum percentage rate of 30.00%. We move to the next phase once the straight-line depreciation is higher.

Phase 2: This phase starts once the straight-line depreciation is higher. The depreciation calculation method for this phase is also Percentage from the useful life, but it is calculated from the remaining useful life. The base value for this phase is also the Net Book Value. We move to the next phase after the end of the useful life.

Phase 3: This phase starts after the end of the useful life. The depreciation calculation method for this phase is Immediate depreciation, which means that the remaining acquisition value of the asset is immediately depreciated. This is the final phase of ordinary depreciation.

Special Tax Depreciation:

Phase 1: This phase starts from the beginning of the special depreciation. The depreciation calculation method for this phase is Stated percentage with a depreciation percentage rate of 20.00%. The base value for this phase is the Acquisition Value. Since this is the only phase of special tax depreciation, there is no changeover to any other phase.

Created by SAP Business AI on 05/22/2024 at 09:34:19    ✉ Send by Email    ( Close )

INTELLIGENT EXPLANATION OF CONFIGURATION KEYS

CROSS-REFERENCE TO RELATED APPLICATIONS

The present application claims the benefit of U.S. Provisional Application No. 63/570,668, filed Mar. 27, 2024, which is incorporated by reference herein.

BACKGROUND

Enterprise resource planning (ERP) is software that allows an organization to use a system of integrated applications to manage their business and automate many back-office functions related to technology, services, and human resources. Some ERP systems, such as S/4HANA provided by SAP SE, of Walldorf, Germany, have many configuration entities, also referred to as configuration keys, which can be used to control various process flows within the ERP system. Generally, a configuration key can define a data operation scheme or operation mode based on one or more tables stored in a database of the ERP system. Understanding those configurations keys can pose challenges for end uses of the ERP systems. Thus, room for improvement exists for providing intelligent explanation of configurations keys in ERP systems.

BRIEF DESCRIPTION OF THE DRAWINGS

FIG. 2 is a flowchart illustrating an example overall method for providing intelligent explanation of configuration keys in an ERP system.

FIGS. 6, 7, 8, and 9 depict an example data object generated for a depreciation key.

FIG. 11 depicts an example explanation generated for a depreciation key.

DETAILED DESCRIPTION

Figure 1:
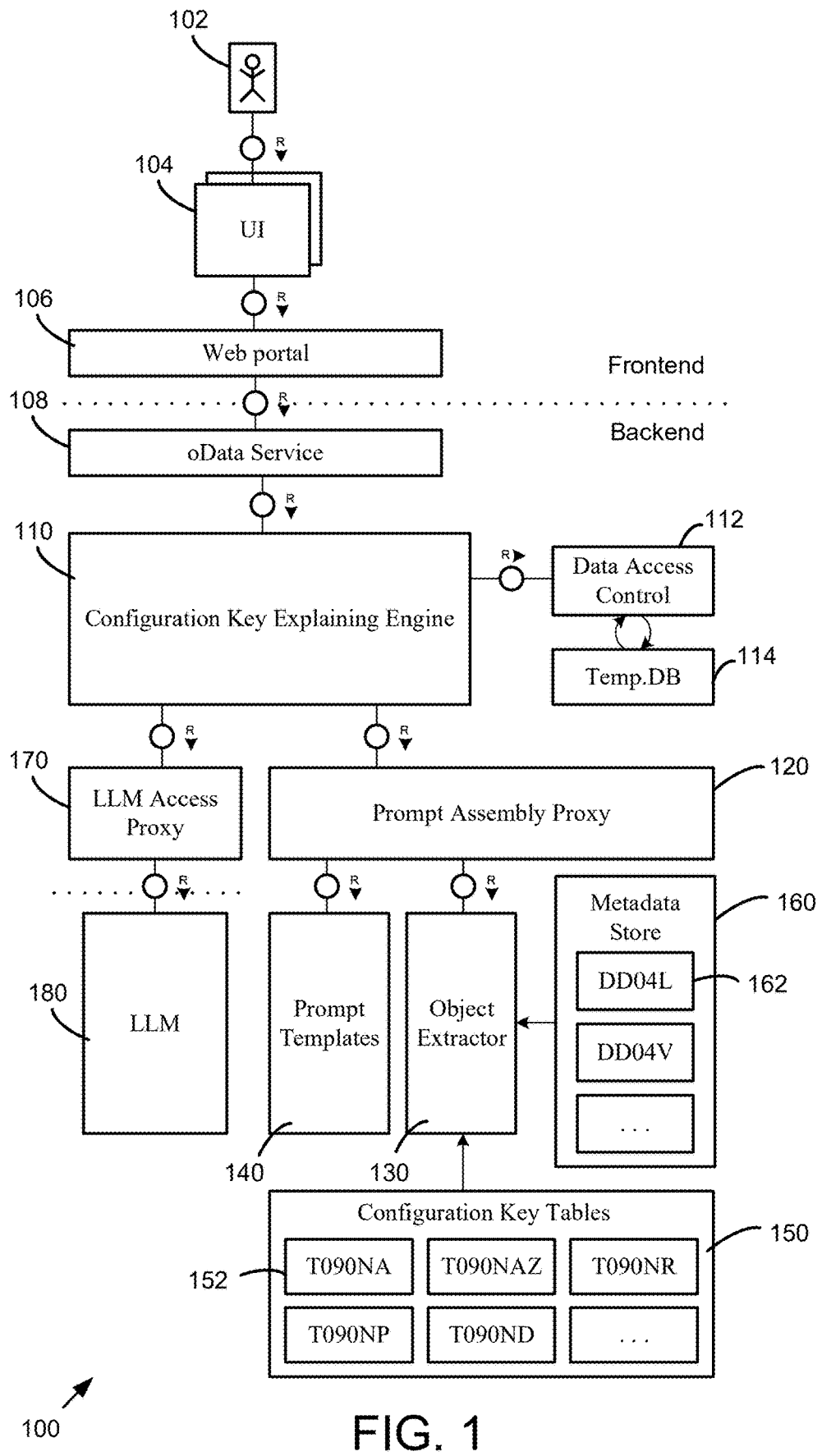
FIG. 1 is an overall block diagram of an example computing system supporting intelligent explanation of configuration keys in an ERP system.

Overview of Configurations Keys in ERP Systems

ERP systems are comprehensive software platforms that integrate a multitude of business processes into a single, unified system. These ERP systems are designed to streamline operations and improve efficiency across various business functions, including technology, services, and human resources.

Within these ERP systems, there are numerous configuration entities, often referred to as configuration codes or configuration keys. These configuration keys can be domain-specific and control the process flows of different entities within the system. Each configuration key can define a data operation scheme (can also be referred to as a "mode of data operation"), which is based on one or more tables stored in a database of the ERP system. Generally, a configuration key can represent a set of rules defining the data operation scheme which governs how the system processes and manages data stored in one or more database tables.

For instance, in the domain of asset accounting, configuration keys can be referred to as depreciation keys. Similarly, in other domains, configuration keys can be referred to as payment terms, costing variants, dunning terms, etc. These configuration keys define the rules for their respective domains, controlling how the system calculates and processes domain-specific data. In some cases, the configuration keys in one domain are predefined. In some cases, end users and/or third parties can add their own configurations keys, e.g., by creating a new configuration key from scratch by defining a new set of rules, or by copying-and-then-modifying existing configuration keys.

The depreciation keys, as an example of such configuration keys, define the rules for calculating depreciation values of fixed assets. An ERP system can use the setting variables from the depreciation keys to determine the depreciation amounts for various depreciation schemes, which can be extremely complicated. For example, a depreciation key can define a depreciation type (e.g., ordinary depreciation or special depreciation). The depreciation key can also define depreciation phases, which can change over time based on the changeover method specified in the depreciation key. The calculation methods can be assigned to each depreciation key for the actual determination of depreciation amounts. These methods could be base method, declining-balance method, multi-level method, period control method, and others. Moreover, the depreciation key can influence the effect of multiple-shift operation, the influence of scrap value on the base value, and the effect of shutdown periods. It can also include additional settings like suspending ordinary depreciation with special depreciation, period control according to the fiscal year, day-exact calculation, and not reducing in the shortened fiscal year, etc.

However, with numerous configuration keys available (e.g., SAP S/4HANA has several thousand depreciation keys), each representing a unique set of complicated rules involving calculations over many attributes from a number of tables, understanding these configuration keys can pose significant challenges for end users. It can take hours for even an experienced user to trace all tables to understand one configuration key. This complexity often leads to confusion among users, often resulting in the creation of support tickets. These tickets not only increase the workload for the product support team, but also incur additional costs associated with ticket handling. Thus, the technical challenges posed by configuration keys represent a significant cost factor and efficiency challenge for organizations using ERP systems.

While it is theoretically possible to pre-generate a summary or explanation for each predefined configuration key, this process can be resource-intensive and may not always be feasible in real-world scenarios. End users and third parties often generate additional configuration keys customized for their own operations. These newly generated configuration keys may not come with corresponding summaries/explanations, making it difficult for other users to understand them. Furthermore, manually generated explanations of the configuration keys are prone to errors. For example, end users and third parties may not accurately document or explain every nuance of the rules in their created configuration keys, thereby leading to further confusion and potential errors.

The technologies described herein address many of the challenges previously mentioned by introducing a framework for intelligent explanation of configuration keys in ERP systems. Leveraging generative artificial intelligence (AI), this framework can provide on-demand, real-time generation of accurate and concise explanations for configuration keys, thereby improving the comprehensibility and usability of configuration keys in ERP systems.

Example Computing System Supporting Intelligent Explanation of Configuration Keys FIG. 1 shows an overall block diagram of an example ERP system 100 supporting intelligent explanation of configuration keys.

In some examples, intelligent explanation of configuration keys can be implemented as a software application running on an ERP system 100. The software application can have a frontend, which provides a user interface 104 through which a user 102 can enter a request to explain a configuration key. As described above, the configuration key represents a set of rules for controlling a process flow of an entity of the ERP system 100 (e.g., a depreciation key controlling the depreciation process of a fixed asset, etc.). The set of rules defines a data operation scheme based on a plurality of tables stored in a database of the ERP system 100.

Through a web portal 106, the request can be sent to a backend of the software application running on a server, which provide core processing capabilities. The backend can be powered by an OData service 108, which provides a standardized protocol for create, read, update, and delete (CRUD) operations. The OData service 108 is responsible for the inbound processing of the user's request. For example, once the request for explaining a configuration key is received, such request can be dispatched by the OData service 108 to a configuration key explaining engine 110, which is configured to coordinate various tasks involved in generating, on demand, explanations for configuration keys.

After receiving the request to explain a configuration key, the configuration key explaining engine 110 can first search a temporary database 114 to determine if an explanation for the configuration key has been previously generated and saved therein. Searching of the temporary database 114 can be performed via a data access control 112, which can be configured to manage access rights of different users. In some examples, the data access control 112 can limit the user 102 to search only a part of the temporary database 114 which stores previously generated explanations of configuration keys that are specific to a tenant of the ERP system 100 (e.g., the user's organization). In some other examples, the data access control 112 can grant the user 102 rights to search the whole temporary database 114 which stores previously generated explanations of configuration keys for all tenants of the ERP system 100.

If the configuration key explanation engine 110 finds that temporary database 114 contains a previously generated explanation for the configuration key user requested, the configuration key explanation engine 110 can retrieve such explanation from the temporary database 114 and present it on the user interface 104, thereby avoiding the need to regenerate the explanation. In other words, by utilizing the temporary database 114 to store previously generated explanations and retrieve them when the same configuration key is queried again, the configuration key explanation engine 110 implements a caching mechanism which can reduce the computation load and speed up the response time for the user 102. It can also ensure consistency in the explanations provided for the same configuration key.

In some examples, after a previously generated explanation for a configuration key is stored in the temporary database 114, that configuration key may be later updated. For example, at least one rule among the set of rules represented by the configuration key might have been modified. In such cases, responsive to receiving an update of the configuration key, the previously generated explanation of the configuration key can be removed from the temporary database 114. This ensures that the temporary database 114 does not retain explanations that no longer accurately represent the current state of their corresponding configuration keys.

Different mechanisms can be used for such removal of outdated explanations from the temporary database 114. For example, the explanations stored in the temporary database 114 can have timestamps indicating date and time when the corresponding configuration keys are created. Thus, when a configuration key is later updated, the system can compare the timestamp of the update with the timestamp attached to the explanation in the temporary database 114. If the update timestamp is later, it indicates that the configuration key has been modified after the explanation was generated and stored. In such cases, the outdated explanation can be flagged for removal. As another example, a standalone application can be triggered by the update of the configuration key. That application can search the temporary database 114 and identify and remove any explanations associated with updated configuration key, thereby ensuring the temporary database 114 only contains relevant and current explanations.

If no previously generated explanation for a configuration key is available in the temporary database 114, the configuration key explaining engine 110 is configured to generate the explanation for the configuration key anew. To generate the explanation, a prompt assembly proxy 120 is employed to generate a prompt, as described further below.

The configuration key explaining engine 110 can send the generated prompt to a large language model, or LLM 180, through an LLM access proxy 170. After receiving the prompt, the LLM 180 can generate a response in runtime. The configuration key explaining engine 110 can convert and/or format the response into an explanation of the configuration key, which summarizes the set of rules represented by the configuration key in natural language. The generated explanation can then be presented to the user 102 on the user interface 104.

As described herein, the LLM access proxy 170 can be configured to interface with different generative artificial intelligence (AI) models (e.g., via different application programming interfaces, or APIs), such as the LLM 180, which is described more fully below. The LLM 180 can be hosted externally (e.g., on a third-party platform) or deployed locally on the ERP system 100.

The prompt assembly proxy 120 can be a software artifact (e.g., a class or a function) configured to assemble the prompt in runtime. To generate the prompt, the prompt assembly proxy 120 uses one or more prompt templates 140, which can be predefined through prompt engineering. In some examples, the prompt templates 140 can include a system prompt and a user prompt. The system prompt can provide context to the LLM 180 such as the environment or domain information of the configuration key (e.g., instructing the LLM 180 that the configuration key is related to asset depreciation, rather than costing variants, payment terms, or other domains). The user prompt can contain specific instructions that guide the LLM 180 to analyze the set of rules represented by the configuration key. Example system prompt and user prompt are described further below.

In some examples, at least one of the prompt templates (e.g., the user prompt) can include at least one placeholder which can be replaced with a dynamically generated data object when assembling the prompt for the LLM 180. In some examples, the generated data object can include a group of key-value pairs which collectively define the set of rules represented by the configuration key.

Generation of the data object can be performed by an object extractor 130, which has access to configuration key tables 150 and a metadata store 160. The configuration key tables 150 includes a plurality of tables 152 that are used to define configuration keys for a specific domain. For instance, in the domain of asset accounting, the object extractor 130 can be configured to access a group of tables which are used to define depreciation keys. Similarly, for payment terms, costing variants, or other domains, the object extractor 130 can be configured to access different groups of tables accordingly. The metadata store 160 can contain metadata corresponding to the configuration key tables 150. For example, the metadata store 160 can include one or more dictionaries 162 which contains metadata of various data objects, such as domain-specific tables 152. Example metadata stored in the dictionaries 162 includes descriptions of the tables 152, descriptions of attributes for various fields or columns of those tables. Additional details of the object extractor 130 for generating the data object are described further below.

In practice, the systems shown herein, such as the ERP system 100, can vary in complexity, with additional functionality, more complex components, and the like. For example, there can be additional functionality within the ERP system 100. Additional components can be included to implement security, redundancy, load balancing, report design, data logging, and the like.

The described computing systems can be networked via wired or wireless network connections, including the Internet. Alternatively, systems can be connected through an intranet connection (e.g., in a corporate environment, government environment, or the like).

The ERP system 100 and any of the other systems described herein can be implemented in conjunction with any of the hardware components described herein, such as the computing systems described below (e.g., processing units, memory, and the like). In any of the examples herein, configuration keys, data objects, prompts, tables, and the like can be stored in one or more computer-readable storage media or computer-readable storage devices. The technologies described herein can be generic to the specifics of operating systems or hardware and can be applied in any variety of environments to take advantage of the described features.

Example Overall Method for Improved Generative AI Support in ERP Systems

FIG. 2 is a flowchart illustrating an example overall method 200 for providing intelligent explanation for configuration keys. The method 200 can be performed, e.g., by the ERP system 100 of FIG. 1.

At step 210, the method can receive, from a user interface (e.g., the user interface 104) of an ERP system, a request to explain a configuration key. As described above, the configuration key represents a set of rules for controlling a process flow of an entity of the ERP system. The set of rules can define a data operation scheme based on a plurality of tables (e.g., the configuration key tables 150) stored in a database of the ERP system.

At step 220, the method can generate, in runtime, a data object from the plurality of tables. In some examples, the data object includes a group of key-value pairs which collectively define the set of rules. In some examples, the data object can be generated by an object extractor (e.g., the object extractor 130), which can query the plurality of tables and retrieve descriptions of those tables from one or more dictionaries (e.g., dictionaries 162) stored in a metadata store (e.g., the metadata store 160).

At step 230, the method can generate, in runtime, a prompt based on the data object generated from the plurality of tables.

At step 240, the method can prompt, in runtime, a large language model (e.g., the LLM 180) using the prompt.

At step 250, the method can receive a response from the large language model.

Then at step 260, the method can output, on the user interface of the ERP system, an explanation of the configuration key based on the response received from the large language model. The explanation of the configuration key summarizes the set of rules in natural language.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "send" can also be described as "receive" from a different perspective.

Overview of LLMs and Prompts

Generative AI models, foundation models, and LLMs are interconnected concepts in the field of AI. Generative AI, a broad term, encompasses AI systems that generate content such as text, images, music, or code. Unlike discriminative AI models that aim to make decisions or predictions based on input data features, generative AI models focus on creating new data points. Foundation models are a subset of these generative AI models, serving as a starting point for developing more specialized models. LLMs, a specific type of generative AI, work with language and can understand and generate human-like text. In the context of generative AI, including LLMs, a prompt serves as an input or instruction that informs the AI of the desired content, context, or task. This allows users to guide the AI to produce tailored responses, explanations, or creative content based on the provided prompt.

In any of the examples herein, an LLM can take the form of an AI model that is designed to understand and generate human language. Such models typically leverage deep learning techniques such as transformer-based architectures to process language with a very large number (e.g., billions) of parameters. Examples include the Generative Pre-trained Transformer (GPT) developed by OpenAI, Bidirectional Encoder Representations from Transforms (BERT) by Google, A Robustly Optimized BERT Pretraining Approach developed by Facebook AI, Megatron-LM of NVIDIA, or the like. Pretrained models are available from a variety of sources.

In any of the examples herein, prompts can be provided, in runtime, to LLMs to generate responses. Prompts in LLMs can be input instructions that guide model behavior. Prompts can be textual cues, questions, or statements that users provide to elicit desired responses from the LLMs. Prompts can act as primers for the model's generative process. Sources of prompts can include user-generated queries, predefined templates, or system-generated suggestions. Technically, prompts are tokenized and embedded into the model's input sequence, serving as conditioning signals for subsequent text generation. Experiment with prompt variations can be performed to manipulate output, using techniques like prefixing, temperature control, top-K sampling, chain-of-thought, etc. These prompts, sourced from diverse inputs and tailored strategies, enable users to influence LLM-generated content by shaping the underlying context and guiding the neural network's language generation. For example, prompts can include instructions and/or examples to encourage the LLMs to provide results in a desired style and/or format.

Example Architecture of LLM

Figure 3:
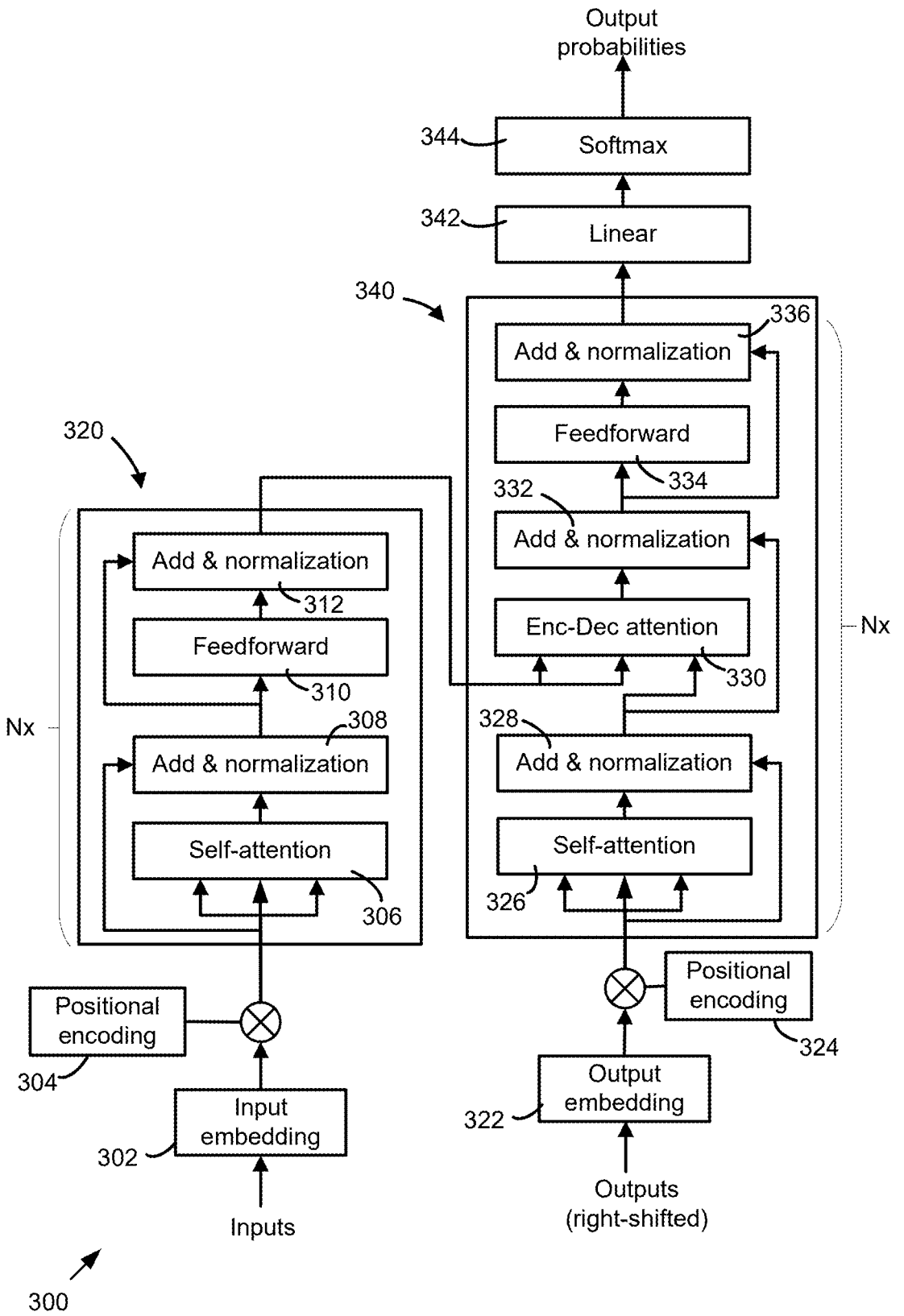
FIG. 3 is an architecture block diagram of an example large language model.

FIG. 3 shows an example architecture of an LLM 300, which can be used as the LLM 180 of FIG. 1.

In the depicted example, the LLM 300 uses an autoregressive model (as implemented in OpenAI's GPT) to generate text content by predicting the next word in a sequence given the previous words. The LLM 300 can be trained to maximize the likelihood of each word in the training dataset, given its context.

As shown in FIG. 3, the LLM 300 can have an encoder 320 and a decoder 340, the combination of which can be referred to as a "transformer." The encoder 320 processes input text, transforming it into a context-rich representation. The decoder 340 takes this representation and generates text output.

For autoregressive text generation, the LLM 300 generates text in order, and for each word it generates, it relies on the preceding words for context. During training, the target or output sequence, which the model is learning to generate, is presented to the decoder 340. However, the output is right shifted by one position compared to what the decoder 340 has generated so far. In other words, the model sees the context of the previous words and is tasked with predicting the next word. As a result, the LLM 300 can learn to generate text in a left-to-right manner, which is how language is typically constructed.

Text inputs to the encoder 320 can be preprocessed through an input embedding unit 302. Specifically, the input embedding unit 302 can tokenize a text input into a sequence of tokens, each of which represents a word or part of a word. Each token can then be mapped to a fixed-length vector known as an input embedding, which provides a continuous representation that captures the meaning and context of the text input. Likewise, to train the LLM 300, the targets or output sequences presented to the decoder 340 can be preprocessed through an output embedding unit 322. Like the input embedding unit 302, the output embedding unit 322 can provide a continuous representation, or output embedding, for each token in the output sequences.

Generally, the vocabulary in LLM 300 is fixed and is derived from the training data. The vocabulary in LLM 300 consists of tokens generated above during the training process. Words not in the vocabulary cannot be output. These tokens are strung together to form sentences in the text output.

In some examples, positional encodings (e.g., 304 and 324) can be performed to provide sequential order information of tokens generated by the input embedding unit 302 and output embedding unit 322, respectively. Positional encoding is needed because the transformer, unlike recurrent neural networks, process all tokens in parallel and do not inherently capture the order of tokens. Without positional encoding, the model would treat a sentence as a collection of words, losing the context provided by the order of words. Positional encoding can be performed by mapping each position/index in a sequence to a unique vector, which is then added to the corresponding vector of input embedding or output embedding. By adding positional encoding to the input embedding, the model can understand the relative positions of words in a sentence. Similarly, by adding positional encoding to the output encoding, the model can maintain the order of words when generating text output.

Each of the encoder 320 and decoder 340 can include multiple stacked or repeated layers (denoted by Nx in FIG. 3). The number of stacked layers in the encoder 320 and/or decoder 340 can vary depending on the specific LLM architecture. Generally, a higher "N" typically means a deeper model, which can capture more complex patterns and dependencies in the data but may require more computational resources for training and inference. In some examples, the number of stacked layers in the encoder 320 can be the same as the number of stacked layers in the decoder 340. In other examples, the LLM 300 can be configured so that the encoder 320 and decoder 340 can have different numbers of layers. For example, a deeper encoder (more layers) can be used to better capture the input text's complexities while a shallower decoder (fewer layers) can be used if the output generation task is less complex).

The encoder 320 and the decoder 340 are related through shared embeddings and attention mechanisms, which allow the decoder 340 to access the contextual information generated by the encoder 320, enabling the LLM 300 to generate coherent and contextually accurate responses. In other words, the output of the encoder 320 can serve as a foundation upon which the decoder network can build the generated text.

Both the encoder 320 and decoder 340 comprise multiple layers of attention and feedforward neural networks. An attention neural network can implement an "attention" mechanism by calculating the relevance or importance of different words or tokens within an input sequence to a given word or token in an output sequence, enabling the model to focus on contextually relevant information while generating text. In other words, the attention neural network plays "attention" on certain parts of a sentence that are most relevant to the task of generating text output. A feedforward neural network can process and transform the information captured by the attention mechanism, applying non-linear transformations to the contextual embeddings of tokens, enabling the model to learn complex relationships in the data and generate more contextually accurate and expressive text.

In the example depicted in FIG. 3, the encoder 320 includes an intra-attention or self-attention neural network 306 and a feedforward neural network 310, and the decoder 340 includes a self-attention neural network 326 and a feedforward neural network 334. The self-attention neural networks 306, 326 allow the LLM 300 to weigh the importance of different words or tokens within the same input sequence (self-attention in the encoder 320) and between the input and output sequences (self-attention in the decoder 340), respectively.

In addition, the decoder 340 also includes an inter-attention or encoder-decoder attention neural network 330, which receives input from the output of the encoder 320. The encoder-decoder attention neural network 330 allows the decoder 340 to focus on relevant parts of the input sequence (output of the encoder 320) while generating the output sequence. As described below, the output of the encoder 320 is a continuous representation or embedding of the input sequence. By feeding the output of the encoder 320 to the encoder-decoder attention neural network 330, the contextual information and relationships captured in the input sequence (by the encoder 320) can be carried to the decoder 340. Such connection enables the decoder 340 to access to the entire input sequence, rather than just the last hidden state. Because the decoder 340 can attend to all words in the input sequence, the input information can be aligned with the generation of output to improve contextual accuracy of the generated text output.

In some examples, one or more of the attention neural networks (e.g., 306, 326, 330) can be configured to implement a single head attention mechanism, by which the model can capture relationships between words in an input sequence by assigning attention weights to each word based on its relevance to a target word. The term "single head" indicates that there is only one set of attention weights or one mechanism for capturing relationships between words in the input sequence. In some examples, one or more of the attention neural networks (e.g., 306, 326, 330) can be configured to implement a multi-head attention mechanism, by which multiple sets of attention weights, or "heads," in parallel to capture different aspects of the input sequence. Each head learns distinct relationships and dependencies within the input sequence. These multiple attention heads can enhance the model's ability to attend to various features and patterns, enabling it to understand complex, multi-faceted contexts, thereby leading to more accurate and contextually relevant text generation. The outputs from multiple heads can be concatenated or linearly combined to produce a final attention output.

As depicted in FIG. 3, both the encoder 320 and the decoder 340 can include one or more addition and normal-ization layers (e.g., the layers 308 and 312 in the encoder 320, the layers 328, 332, and 336 in the decoder 340). The addition layer, also known as a residual connection, can add the output of another layer (e.g., an attention neural network or a feedforward network) to its input. After the addition operation, a normalization operation can be performed by a corresponding normalization layer, which normalizes the features (e.g., making the features to have zero mean and unit variance), This can help in stabilizing the learning process and reducing training time.

A linear layer 342 at the output end of the decoder 340 can transform the output embeddings into the original input space. Specifically, the output embeddings produced by the decoder 340 are forwarded to the linear layer 342, which can transform the high-dimensional output embeddings into a space where each dimension corresponds to a word in the vocabulary of the LLM 300.

The output of the linear layer 342 can be fed to a softmax layer 344, which is configured to implement a softmax function, also known as softargmax or normalized exponen-tial function, which is a generalization of the logistic func-tion that compresses values into a given range. Specifically, the softmax layer 344 takes the output from the linear layer

342 (also known as logits) and transforms them into prob-abilities. These probabilities sum up to 1, and each prob-ability corresponds to the likelihood of a particular word being the next word in the sequence. Typically, the word with the highest probability can be selected as the next word in the generated text output.

Still referring to FIG. 3, the general operation process for the LLM 300 to generate a reply or text output in response to a received prompt input is described below.

First, the input text is tokenized, e.g., by the input embedding unit 302, into a sequence of tokens, each repre-senting a word or part of a word. Each token is then mapped to a fixed-length vector or input embedding. Then, positional encoding 304 is added to the input embeddings to retain information regarding the order of words in the input text.

Next, the input embeddings are processed by the self-attention neural network 306 of the encoder 320 to generate a set of hidden states. As described above, multi-head attention mechanism can be used to focus on different parts of the input sequence. The output from the self-attention neural network 306 is added to its input (residual connec-tion) and then normalized at the addition and normalization layer 308.

Then, the feedforward neural network 310 is applied to each token independently. The feedforward neural network 310 includes fully connected layers with non-linear activa-tion functions, allowing the model to capture complex interactions between tokens. The output from the feedfor-ward neural network 310 is added its input (residual con-nection) and then normalized at the addition and normal-ization layer 312.

The decoder 340 uses the hidden states from the encoder 320 and its own previous output sequence to generate the next token in an autoregressive manner so that the sequential output is generated by attending to the previously generated tokens. Specifically, the output of the encoder 320 (input embeddings processed by the encoder 320) are fed to the encoder-decoder attention neural network 330 of the decoder 340, which allows the decoder 340 to attend to all words in the input sequence. As described above, the encoder-decoder attention neural network 330 can imple-ment a multi-head attention mechanism, e.g., computing a weighted sum of all the encoded input vectors, with the most relevant vectors being attributed the highest weights.

The previous output sequence of the decoder 340 is first tokenized by the output embedding unit 322 to generate an output embedding for each token in the output sequence. Similarly, positional embedding 324 is added to the output embedding to retain information regarding the order of words in the output sequence.

The output embeddings are processed by the self-attention neural network 326 of the decoder 340 to generate a set of hidden states. The self-attention mechanism allows each token in the text output to attend to all tokens in the input sequence as well as all previous tokens in the output sequence. The output from the self-attention neural network 326 is added to its input (residual connection) and then normalized at the addition and normalization layer 328.

The encoder-decoder attention neural network 330 receives the output embeddings processed through the self-attention neural network 326 and the addition and normal-ization layer 328. Additionally, the encoder-decoder atten-tion neural network 330 also receives the output from the addition and normalization layer 312 which represents input embeddings processed by the encoder 320. By considering both processed input embeddings and output embeddings, the output of the encoder-decoder attention neural network

330 represents an output embedding which takes into account both the input sequence and the previously generated outputs. As a result, the decoder 340 can generate the output sequence that is contextually aligned with the input sequence.

The output from the encoder-decoder attention neural network 330 is added to part of its input (residual connection), i.e., the output from the addition and normalization layer 328, and then normalized at the addition and normalization layer 332. The normalized output from the addition and normalization layer 332 is then passed through the feedforward neural network 334. The output of the feedforward neural network 334 is then added to its input (residual connection) and then normalized at the addition and normalization layer 336.

The processed output embeddings output by the decoder 340 are passed through the linear layer 342, which maps the high-dimensional output embeddings back to the size of the vocabulary, that is, it transforms the output embeddings into a space where each dimension corresponds to a word in the vocabulary. The softmax layer 344 then converts output of the linear layer 342 into probabilities, each of which corresponds to the likelihood of a particular word being the next word in the sequence. Finally, the LLM 300 samples an output token from the probability distribution generated by the softmax layer 344 (e.g., selecting the token with the highest probability), and this token is added to the sequence of generated tokens for the text output.

The steps described above are repeated for each new token until an end-of-sequence token is generated or a maximum length is reached. Additionally, if the encoder 320 and/or decoder 340 have multiple stacked layers, the steps performed by the encoder 320 and decoder 340 are repeated across each layer in the encoder 320 and the decoder 340 for generation of each new token.

Example Database Tables for Depreciation Keys

As described above, configuration keys can be domain specific. For example, thousands of depreciation keys can be defined in the domain of asset accounting. Similarly, thousands of configuration keys can be defined in each of other domains (e.g., payment terms, costing variants, dunning terms, etc.). For illustrative purposes, depreciation keys are used as examples in the following descriptions, although it should be understood that the same principles can be applied to configurations keys in other domains.

A depreciation key represents a set of rules for controlling how the depreciation values of a fixed asset shall be calculated. The set of rules can define a multitude of variables controlling depreciation types, depreciation phases, depreciation formulas, and the like. For each depreciation key, the set of rules defines a specific data operation scheme based on a plurality of depreciation key tables. All depreciation keys can be defined based on the same plurality of depreciation key tables.

Figure 4:
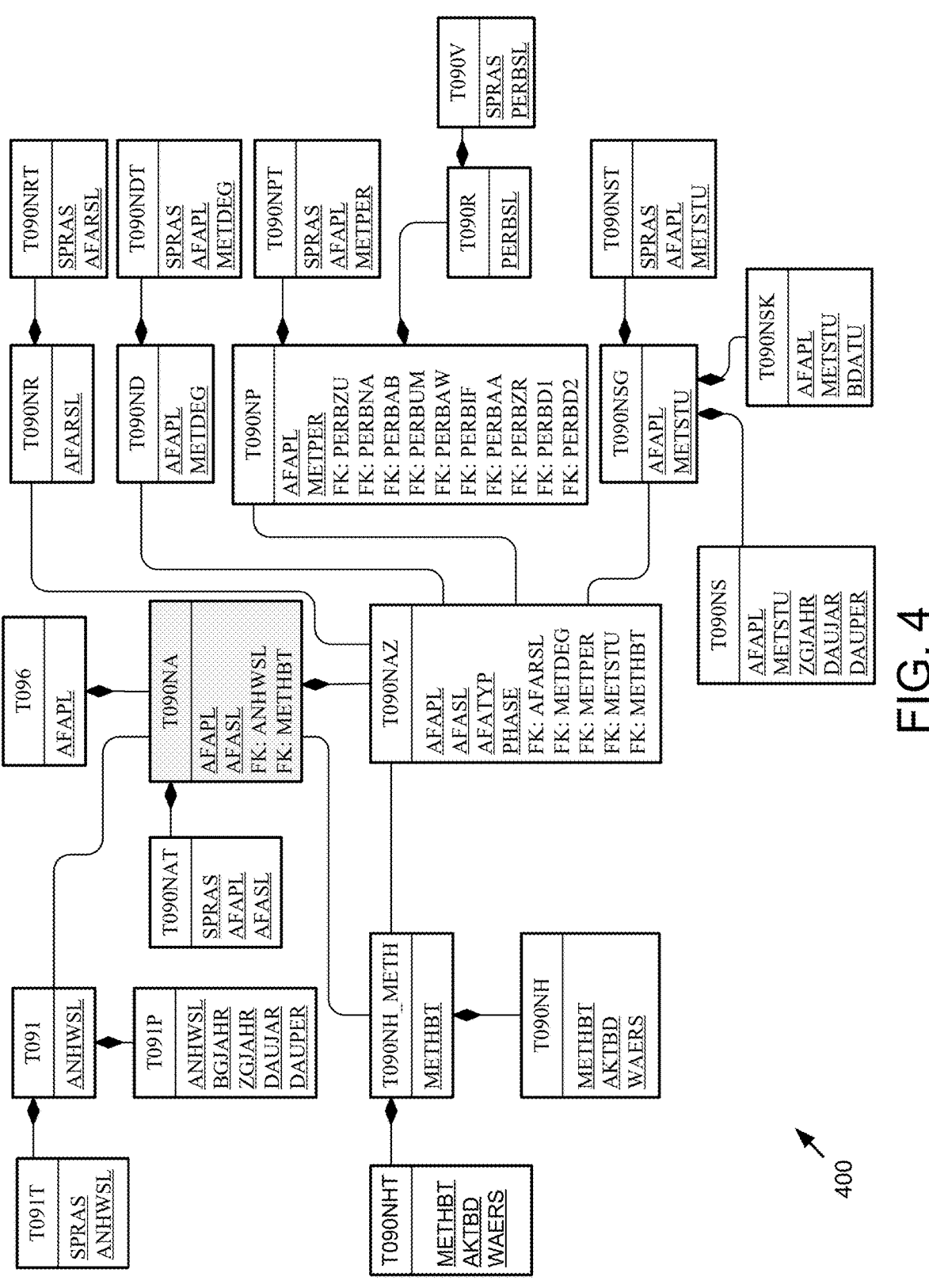
FIG. 4 depicts an example group of tables used in definition of depreciation keys.

For example, FIG. 4 shows a group of depreciation key tables 400 that can be used to define various depreciation keys. In the depicted example, each depreciation key table has a table name starting with letter T (e.g., tables T090NA, T096, T090NAZ, etc.). Each depreciation key table can have one or more primary keys which are underlined (e.g., table T090NA has two primary keys AFAPL and AFASL, etc.).

Additionally, some depreciation key tables can define one or more foreign keys (denoted by FK) which are linked to primary keys in other tables (e.g., table T090NA has two foreign keys ANHWSL and METHBT which are linked to corresponding primary keys in tables T091 and T090NH_METH, respectively). Further, each table can include a plurality of attributes or fields (e.g., corresponding to different columns) with specific attribute or field names. For example, table T090NA can have over a dozen fields including MANDT, AFAPL, AFASL, etc. For simplicity, attributes of the tables are omitted in FIG. 4.

The group of depreciation key tables 400 defines a data scope of the depreciation keys. In other words, only data contained in the depreciation key tables 400 are used to define rules or used in calculation of depreciation values. For example, the primary key SPRAS in table T090NRT is linked to a corresponding foreign key in another table T002 (not shown). The table T002, which contains language codes and is not used in calculating depreciation values, is therefore not within the data scope of the depreciation keys.

On the other hand, it is not necessary to use all tables depicted in FIG. 4 to define a depreciation key. In other words, it is possible to define rules of a depreciation key using only a subset of the depreciation key tables 400. For example, if the rules of a depreciation key do not specify a cut off value, then tables related to cut off value keys (e.g., tables T091 and T091P) will not be needed to calculate depreciation.

The group of depreciation key tables 400 can form a hierarchical structure that defines the rules for calculating depreciation values of a fixed asset. One of the depreciation key tables, e.g., table T090NA, contains entries or records of all available depreciation keys, and can be designated as a root table. For each depreciation key, a specific table hierarchy, starting from the root table T090NA, can be established based on the set of rules represented by the depreciation key. For example, a depreciation key defined in the root table T090NA can have rules specifying a specific depreciation method, which is listed in table T090NAZ. Thus, table T090NAZ can be deemed as a child node of the root table T090NA. Further, if the specified depreciation method involves a specific period control method, which is listed in table T090NP, then table T090NP can be deemed as a child node of the table T090NAZ, and so on.

Example Object Extractor and Data Object

As described above and further illustrated in FIG. 5, to generate explanation for a configuration key, a data object 520 can be dynamically generated by extracting relevant data from configuration key tables 550 (similar to the configuration key tables 150) and a corresponding metadata store 560 (similar to the metadata store 160). The configuration key tables 550 includes a plurality of tables 552 that are used to define configuration keys for a specific domain (e.g., for asset accounting, the configuration key tables 550 can include depreciation key tables 400 of FIG. 4). The metadata store 560 can include one or more dictionaries 562 which contains descriptions of the configuration key tables 550, including descriptions of different attributes or fields within those tables.

The data object 520 can include a group of key-value pairs which collectively define the set of rules represented by the configuration key. In some examples, the data object 520 can be organized in JavaScript Object Notation (JSON) format. As an example, FIGS. 6, 7, 8, and 9 show a data object 600 corresponding to a depreciation key S7GD, which is extracted from the depreciation key tables 400 of FIG. 4. In the depicted example, each key-value pair includes a key and a value separated by a colon, and both the key and the value are in text or string format and enclosed in quotation marks.

Extraction of the data object 520 can be performed by a data extractor 530 (similar to the data extractor 130). The object extractor 530 can be a software artifact (e.g., a class or a function) configured to parse the configuration key tables 550 to identify the set of rules represented by a configuration key. The data extractor 540 can receive domain specific table definitions 540 as input parameters. Example domain specific table definitions 540 includes specification of a root table and a namespace which defines the data scope of the configuration keys. For example, in the domain of asset accounting, the domain specific table definitions 540 can specify a namespace which includes all depreciation tables 400 of FIG. 4, and further denotes table T090NA as the root table. The namespace can be specified in different ways. For example, the namespace can be specified by enumerating the complete list of configuration key tables 550 in the specific domain. As another example, the namespace can be specified by using wildcards that define patterns of table names (e.g., T09* representing table names starting with T09, etc.). In some examples, domain specific table definitions 540 can further include definitions of hierarchical relationship (e.g., parent-child relationship) between the configuration key tables 550.

In some examples, the object extractor 530 can be configured to locate, among the plurality of configuration key tables 550, a subset of tables containing a plurality of attributes specifically involved in the data operation scheme defined by the set of rules of a given configuration key. The subset of tables can be located, e.g., by tracing one or more foreign-key relationships confined within the plurality of configuration key tables 550, that is, such tracing is confined within the data scope defined by the specified namespace. For example, if the rules of a given depreciation key define data operation involving attributes of only four tables among all depreciation tables 400, then the object extractor 530 identifies these four tables as the subset involved in the data operation scheme of the given depreciation key. This subset can be identified by tracing the foreign-key relationship confined within the depreciation tables 400 defined by the specified namespace.

In some examples, the input to the object extractor 530 (i.e., the domain specific table definitions 540) do not include definitions of hierarchical relationship between the configuration key tables 550. In such circumstances, the object extractor 530 can be configured to automatically identify the hierarchy relationship between the subset of tables 400 for the given configuration key by tracing the foreign key relationships described above. For example, the parent-child relationships of the configuration key tables 400 can be defined as a special type of foreign key relationship and contained in the metadata store 560. The object extractor 530 can be configured to obtain the parent-child relationships of the configuration key tables 400 through specific APIs of the metadata store 560. Based on the information of the root table and the namespace of tables to be analyzed, the object extractor 530 can be configured to analyze which of the tables within the namespace has a parent-child relationship to the root table. For instance, once the object extractor 530 has identified T091 as a child table of the root table T090NA, it will again use the same approach to identify which of the tables in the namespace have a parent-child relationship to table T091, and thereby find the table T091P, and so on.

For the given configuration key, the object extractor 530 is configured to construct the group of key-value pairs included in the data object 520 in runtime. The group of key-value pairs included in the data object 520 can be organized in a nested structure which defines a hierarchical relationship between the subset of tables that contain attributes specifically involved in the data operation scheme defined by the set of rules.

For example, the example data object 600 depicted in FIGS. 6-9 includes a top-level node named "Depreciation Keys" with several attributes. This node further contains subnodes, each representing a different aspect of depreciation, such as "Ordinary depreciation." Each of these subnodes, in turn, contains its own subnodes, representing different phases of depreciation, such as "Phase: 1," "Phase: 2," etc. Each phase node has a list of attributes that define the specific parameters for that phase of depreciation. Further, each phase node can contain additional subnodes, such as "Multilevel Method", which provide more granular details about the depreciation calculation. This nesting can continue to lower levels, allowing for even more detailed subnodes under selected nodes, thereby allowing for a detailed and organized representation of the complex relationships and dependencies involved in the depreciation process.

The object extractor 530 is configured to navigate through different levels of the table hierarchy to extract the relevant key-value pairs in runtime. For example, to generate the data object 600, the object extractor 530 begins by parsing the root table (e.g., T090NA). It identifies the depreciation key S7GD and its associated rules, which are represented as key-value pairs. These key-value pairs form the top-level node of the data object 600. Next, the object extractor 530 moves to the child table (e.g., T090NAZ) as dictated by the rules of the depreciation key S7GD. It extracts the relevant attributes from the child table and constructs additional key-value pairs. These pairs are added to the data object as subnodes under the corresponding parent node, preserving the hierarchical relationship between the tables. This process continues recursively for each subsequent child table, building a nested structure of key-value pairs in the data object that mirrors the hierarchy of the tables in the database.

In some examples, the key-value pairs included in the data object 520 are expressed in descriptive text, which can be retrieved, in runtime, from the metadata store 560 by the object extractor 530. The metadata store 560 contains dictionaries 562 (such as SAP ABAP data dictionaries) which are repositories where metadata related to the configuration key tables 550 are stored. Such metadata includes, but is not limited to, text description of tables, text description for different fields (table attributes) of the tables, data types for different fields, etc.

In some examples, the object extractor 530 can be configured to obtain text descriptions of the subset of tables from the dictionaries 562 associated with the configuration key tables 550. Instead of using the actual table names, which may not be easily understandable, these text descriptions can be used as values for the keys representing node names in the data object 520. For instance, in FIG. 6, the node name for the top-level node in the data object 600 has the value "Depreciation Keys" (a short table description retrieved from a dictionary associated with the root table T090NA), which is more descriptive than the actual table name T090NA.

In some examples, the object extractor 530 can be configured to obtain data values corresponding to the plurality of attributes from the subset of tables, and pairing the data values (represented in text format) with text descriptions of the plurality of attributes retrieved from the dictionaries 562 (and using these text descriptions as keys in the key-value pairs). For example, in FIG. 6, the field name or attribute AFASL (in root table T090NA) is represented by the key "Depreciation Key." Likewise, the field name or attribute XPERGJ (in root table T090NA) is represented by the key "Period control per fiscal year." These text descriptions can be retrieved from the dictionary associated with the root table T090NA. The corresponding values for these keys can be retrieved directly from the configuration key table itself. For example, FIG. 6 shows that the value for "Depreciation Key" is "S7GD" (in the top-level node) and the value for "Depreciation Type" is "Ord. depreciation" (in the first subnode). These values are retrieved verbatim (as text strings) from respective columns of the corresponding depreciation key tables. In some cases, if the data stored in the configuration key tables are of numerical data types, these numerical values can be converted into string format to serve as the retrieved values for the corresponding key-value pairs. For example, FIG. 9 shows that the 20% "Depreciation Percentage Rate" is converted to a string "20.0000." In some circumstances, raw data values in the configuration key tables can have specific notations. For example, some attributes can accept Boolean values with specific notations (e.g., a cross [X] indicates true and an empty cell [ ] means false, etc.). These allowable field value notations can be specified in the metadata store 560 dictionaries 562. The object extractor 530 can convert these notations into more human-readable text format to serve as the retrieved values for the corresponding key-value pairs (e.g., [X] is converted to "Yes" and [ ] is converted to "No," or the like). For example, FIGS. 6-9 show many fields with Boolean values expressed as "Yes" and "No." Presenting all data values in string format ensures a consistent data type across the data object data object 600.

In summary, the object extractor 530 can construct the group of key-value pairs in the data object 520 in such a way that preserves the hierarchical relationship between the tables and provides a descriptive representation of the data operation scheme represented by the configuration key in human readable or natural language.

Example Prompt Assembly

Figure 5:
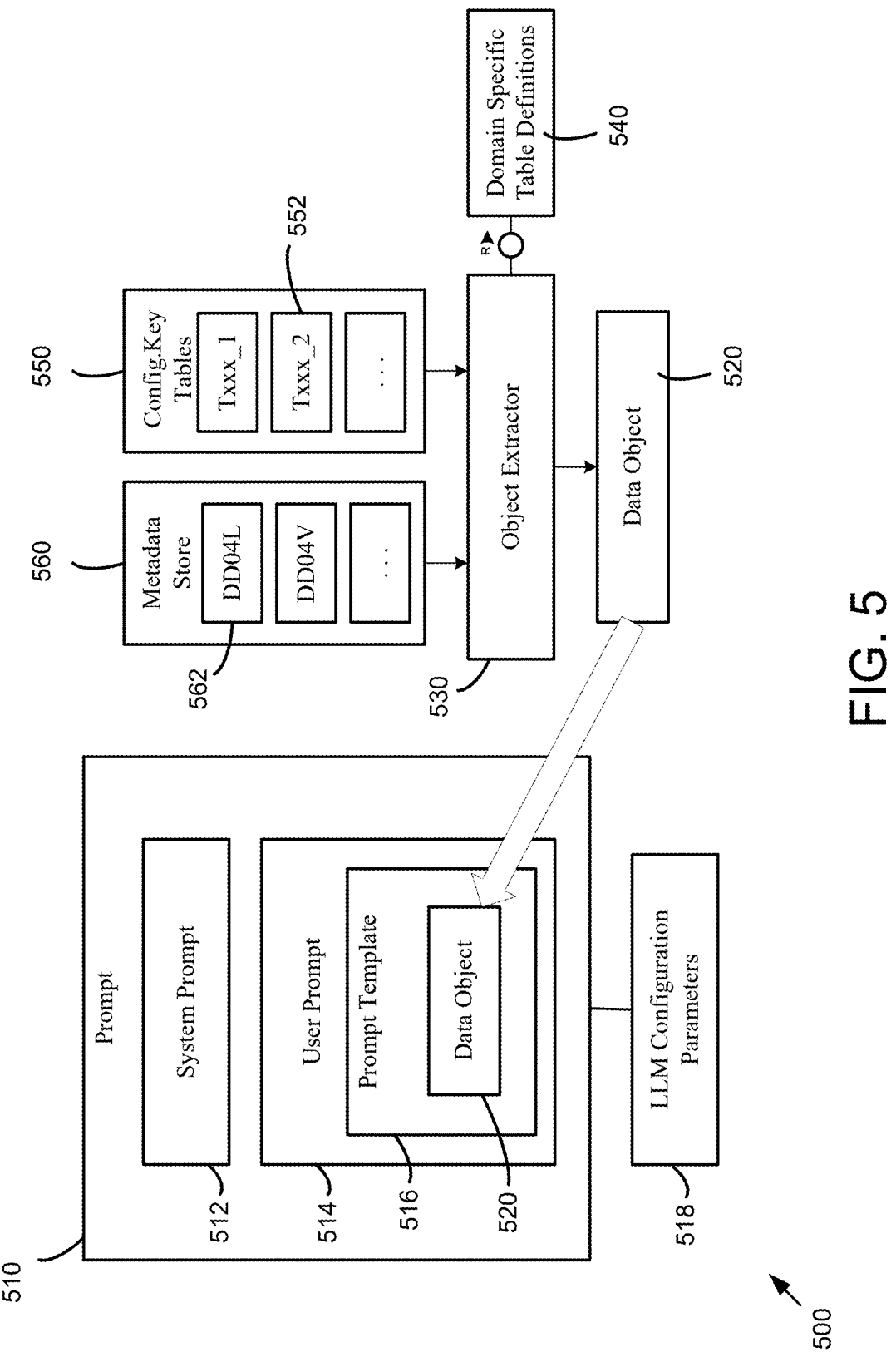
FIG. 5 is a block diagram depicting extraction of a data object and assembling a prompt using the extracted data object.

As shown in FIG. 5, the extracted data object 520 can be used to construct or assemble a prompt 510. Construction of the prompt 510, can be performed in runtime, e.g., by the prompt assembly proxy 120 of FIG. 1.

In some examples, the prompt 510 can include a system prompt 512 and a user prompt 514. The system prompt 512 can be a structured set of instructions that guide an LLM (e.g., the LLM 180) in generating a response. Specifically, the system prompt 512 can set the context and define the role and/or task for the LLM. The system prompt 512 can be domain specific. Below is an example system prompt which can be used for explaining a depreciation key:

<Context>
You are a digital assistant for an asset accountant in an SAP ERP System. Your task is to explain the algorithmic function and calculation procedure of depreciation keys.
Depreciation keys in Asset Accounting usually have several phases, and always start the depreciation calculation with the first phase. Except of the last phase, each phase has a changeover rule described by a so-called changeover method. Once the condition for changing over is met, the system will automatically change over to the next phase, and the calculation rules of the next phase will apply.
Within each phase, the calculation algorithm of the depreciation follows the mathematical structure "depreciation = base value * depreciation percentage rate", but you are not allowed to repeat this formular in your answer.
</Context> ###

In this example, the system prompt instructs the LLM to act as a digital assistant for an asset accountant in an SAP ERP System. The task is to explain the algorithmic function and calculation procedure of depreciation keys in Asset Accounting. This example system prompt also provides specific details about the depreciation keys, their phases, changeover rules, and calculation algorithms. It also specifies a constraint that the LLM should not repeat the formula "depreciation=base value*depreciation percentage rate" in its answer.

The user prompt 514 can be configured as a dynamic part of the prompt 510 that is constructed using a prompt template 516. The prompt template 516 includes at least one placeholder which can be replaced by the extracted data object 520. In other words, the data object 520 generated by the object extractor 530 can be directly inserted into the prompt 510 (e.g., by the prompt assembly proxy 120). The prompt template 516 of the user prompt 514 can provide more detailed and task-specific instructions to the LLM. An example user prompt is provided below:

<Instructions>
Act as a digital assistant for an asset accountant in an SAP S/4HANA Public Cloud
System. Explain the function and calculation procedure of the provided depreciation key in
business user facing language. The technical details of the depreciation key are provided as
part of the prompt in JSON format delimited by the XML Tag DEPRKEY. Let's think step
by step and provide reasoning for your answers.
</Instructions> ###
<IMPORTANT_BOUNDARY_CONDITIONS>###
- if the Depreciation calculation method is 'Percentage from the useful life', the attribute
'Calculate percentage from remaining useful life' defines whether it is over useful life or
remaining useful life.
- if the Depreciation calculation method is 'Immediate depreciation', the percentage rate is
always 100%.
- if the depreciation classification is 'Declining-balance depreciation', then the percentage
rate is defined by the Declining-balance multiplication factor and the Maximum percentage
rate.
- if the depreciation classification is 'Stated percentage', then it is mandatory to include the
percentage rate in the explanation of this phase.
- if the Depreciation calculation method is 'No automatic calculation', then this means, this
key's phase doesn't calculate and depreciation. In this case, all other settings of the phase
must be ignored! In such a case, keep it very short and only reply: "This phase starts from
[...]. The depreciation calculation method for this phase is 'No automatic calculation',
which means that this phase doesn't calculate any depreciation."
- if the Depreciation Calculation Method is 'Immediate depreciation' for Phase 1, then this
means the entire asset value is immediately deprecated. In such a case, focus on the
settings of 'Start of Validity' and 'Period Control', and ignore all other settings of this phase.
- any percentage rates must be formatted appropriately.
</IMPORTANT_BOUNDARY_CONDITIONS>###
<Theme>
The explanation should be written in HTML format according to the formatting rules
provided below delimited by the XML Tag HMTL_FORMATTING.
- Use end user facing accounting business language.
- Provide an introducing abstract of the key's features, listing the supported depreciation
types (such as ordinary depreciation and special tax depreciation).
- Provide a list of all the phases of the depreciation key, structured by depreciation type.
- Focus on the depreciation calculation formula "depreciation = base value * depreciation
percentage rate". For each phase, mention the base value and explain how the depreciation
percentage rate is being calculated (e.g. percentage from useful life, percentage from
remaining useful life, stated percentage etc.).
- For each phase, provide details about what how the changeover to the next phase
happens, unless it is the last phase for a depreciation type.
- If the depreciation classification of a phase is 'Declining-balance depreciation', then it is
mandatory to include the Declining-balance multiplication factor and the Maximum
percentage rate in the explanation of this phase. Make sure to format the factor and
percentage appropriately.
- If the depreciation classification of a phase is 'Stated percentage', then it is mandatory to
include the percentage rate in the explanation of this phase. Make sure to format the
percentage appropriately.
- The result shall follow the pattern as provided in the below examples which us delimited
by the XML tag EXAMPLE.
<EXAMPLES>
Example 1 is for a complex key (let's assume the Depreciation key is labeled 'AAAA') with
multiple depreciation types and multiple phases.
<EXAMPLE_1>
The depreciation key AAAA supports the depreciation types ordinary depreciation and
special tax depreciation.
Ordinary depreciation:
Phase 1: in the first phase [...]. For this phase, the base value is [...] and the depreciation
percentage rate is [...]. We move to the next phase once [...].
Phase 2: in the second phase [...]. For this phase, the base value is [...] and the depreciation
percentage rate is [...]. We move to the next phase once [...].
Phase 3: in the third phase [...]. This is the final phase of ordinary depreciation.
Special tax depreciation:
Phase 1: in the first phase [...]. For this phase, the base value is [...] and the depreciation
percentage rate is [...]. We move to the next phase once [...].
Phase 2: in the second phase [...]. For this phase, the base value is [...] and the depreciation
percentage rate is [...]. We move to the next phase once [...].
Phase 3: in the third phase [...]. This is the final phase of special tax depreciation.
</EXAMPLE_1>
Example 2 is for a simple key (let's assume the Depreciation key is labeled 'BBBB') which
has only one phase for Ordinary Depreciation with Depreciation Calculation Method 'No
automatic calculation':
<EXAMPLE_2>
The depreciation key BBBB supports only the depreciation type ordinary depreciation.
Phase 1: This phase starts from the beginning of the depreciation. The depreciation
calculation method for this phase is No automatic calculation, which means that this phase
doesn't calculate any depreciation. Since this is the only phase of this key, there is no
changeover to any other phase.
</EXAMPLE_2>
Note: in example 2, all other settings of the depreciation key have to be ignored###
Example 3 is for a simple key (let's assume the Depreciation key is labeled 'CCCC') which -continued

```
has only one phase for Ordinary Depreciation with Depreciation Calculation Method
'Immediate depreciation' and Base Value Key 'Acquisition value':
<EXAMPLE_3>
The depreciation key CCCC supports only the depreciation type ordinary depreciation.
Phase 1: This phase starts from the beginning of the depreciation. The depreciation
calculation method for this phase is 'Immediate depreciation' which means that the entire
acquisition value of the asset is immediately depreciated.
</EXAMPLE_3>
###Note: in example 3, all other settings of the depreciation key have to be ignored###
</EXAMPLES>
</Theme> ###
<HMTL_FORMATTING>
The explanation should be written in HTML format. No HTML header or title is needed.
Each paragraph shall be enclosed in HTML "p" tags.
Make sure you highlight the following key words and aspects by enclosing them in HTML
"strong" tags:
- the 4 character code of the depreciation key itself (such as "AAAA", "BBBB", and
"CCCC" in the above examples).
- the relevant depreciation types, such as "Ordinariy Depreciation", "Special Tax
Depreciation" etc.
- the phases assigned to each depreciation type (such as "Phase 1:", "Phase 2:", "Phase 3:").
Within the description of each phase, make sure you highlight the values of the following
attributes by enclosing them in HTML "strong" tags:
- the applied Depreciation Calculation Method (e.g.: "Percentage from the useful life",
"Percentage from remaining useful life", "Immediate sepreciation", "Stated percentage").
- the Declining-Balance Multiplication Factor and Maximum Percentage Rate (in %) used
in this phase, in case the Ordinary Depreciation Classification is "Declining-balance
depreciation".
- the changeover rule, in case there is a changeover to a next phase (e.g.: "No automatic
changeover, "Changeover as soon as straight-line depreciation is higher", "Changeover
after end of the useful life").
- the Ordinary Depreciation Classification used in the phase (e.g.: "Straight-line
depreciation", "Declining-balance depreciation", "Other depreciation").
- the Base Value Key for Depreciation Calculation used in the phase (e.g.: "Acquisition
value", "Limited replacement value", "Net book value").
- the Depreciation Percentage Rate (in %) used in this phase, in case the Depreciation
Calculation Method is "Stated percentage".
</HMTL_FORMATTING> ###|
<DEPRKEY>{ iv_cfg_key_json }</DEPRKEY>
<Instructions>
Act as a digital assistant for an asset accountant in an SAP S/4HANA Public Cloud
System. Explain the function and calculation procedure of the provided depreciation key.
The technical details of the depreciation key are provided as part of the prompt in JSON
format delimited by the XML Tag DEPRKEY. Make sure you adhere to the HTML
Formatting rules as provided in the XML Tag HMTL_FORMATTING.
</Instructions> ###
```

This example user prompt describes boundary conditions, themes, and illustrative examples. The boundary conditions stipulate specific rules and criteria that the LLM must adhere to when formulating its response. These include conditions related to various depreciation calculation methods, depreciation classifications, and formatting requirements for percentage rates. The themes provide additional guidelines on the structure and format of the explanation. For example, they specify that the explanation should be composed in HTML format, with each paragraph enclosed in HTML "p" tags and emphasized words highlighted using HTML "strong" tags. The themes also provide specific instructions on the content of the explanation, such as an introduction overview of the key's attributes, a list of all the phases of the depreciation key, and details about the depreciation calculation formula and changeover rules for each phase. The examples provide specific scenarios that illustrate how the LLM should generate its response based on different depreciation keys and their settings. Notably, this example user prompt includes a placeholder {iv_cfg_key_json} demarcated by the XML Tag DEPRKEY. This placeholder can be substituted with the extracted data object 520, which contains technical details of the depreciation key in JSON format.

It should be understood that the system prompt and user prompt described above are merely exemplary, and varia-tions or modifications could be made without deviating from the principles taught herein. For example, additional context information can be specified in the system prompt; additional boundary conditions, themes, and/or examples can be included in the user prompt; etc.

The generated prompt 510 can be submitted to the LLM via an LLM access layer (e.g., the LLM access proxy 170) to elicit a response. In some examples, along with the prompt 510, additional model configuration parameters 518 can be sent to the LLM. Example model configuration parameters 518 include max tokens (the maximum length of the generated text), temperature (controls the randomness of predictions), etc. The response generated by the LLM can be presented to the user as an explanation, which summarizes the set of rules of the configuration key in natural language.

Example Translation

In some examples, the text descriptions of the configuration keys stored in the metadata store or dictionaries are in English and the explanation generated by the LLM are also in English. In some examples, the end user of the ERP system may speak a different language (e.g., French). In some examples, some of the text descriptions of the configuration keys stored in the metadata store may also be written in a language that is other than English. To handle such circumstances, the configuration key explaining engine 110 can be configured to implement runtime translations.

For example, if the generated explanation is English but the end user logged on in a different language (target language), the configuration key explaining engine 110 can send another translation prompt to the LLM 180, which in turn can translate the explanation from English to the target language. The translation prompt can be one of the prompt templates 140. Below is an example translation prompt:

```
<Instructions>
Translate the following text which is provided within the XML Tag
<INPUT_TEXT_EN> from English to the target language.
The target language is provided within the XML Tag <TARGET_LANGUAGE_ISO>
in the ISO 639-1 language code format.
Make sure you stick to the relevant business terminology for your translation.
The text might contain HTML tags for formatting, such as HTML "p" tags and HTML
"strong" tags. Make sure you preserve those HTML tags.
</Instructions> ###
<INPUT_TEXT_EN>{ iv_completion_en }</INPUT_TEXT_EN>
<TARGET_LANGUAGE_ISO>{ lv_target_language_iso }
</TARGET_LANGUAGE_ISO>
```

If some of the text descriptions of the configuration keys stored in the metadata store are written in a foreign language, those text descriptions can be first translated into English (e.g., by calling the LLM using the same or similar translation prompt above), and then the translated descriptions can be used to generate the data object, which can be inserted into the prompt for sending to the LLM (assuming the LLM was pretrained in English).

Example Use Case

Figure 10:
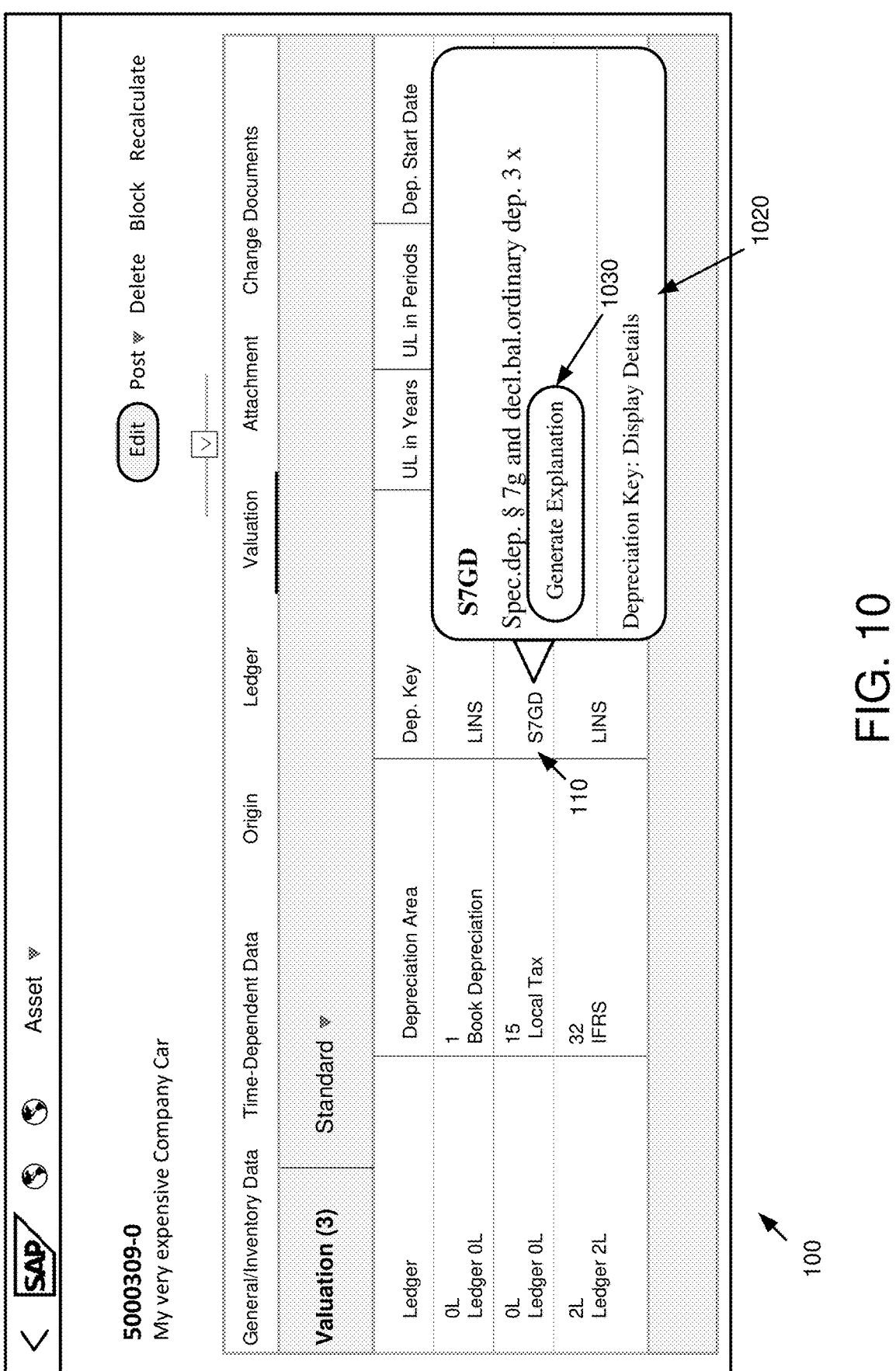
FIG. 10 is an example user interface for intelligent explanation of configuration keys in an ERP system.

FIGS. 10 and 11 illustrate an example use case of intelligent explanation of configuration keys.

FIG. 10 shows an example user interface 1000 of an ERP system which shows a list of assets, each having a depreciation key (in "Dep. Key" column). A user can select one of the depreciation keys to active the software application for intelligent explanation of configuration keys. For example, by right clicking the depreciation key S7GD, a popup window 1020 can be generated, through which the user can set a request to generate an explanation for the selected depreciation key, e.g., by clicking the "Generate Explanation" button 1030. After receiving this user request, the system can either retrieve the explanation for the depreciation key (e.g., from the temporary database 114) if the explanation has been previously generated for the same depreciation key, or otherwise assemble a prompt in runtime and call the LLM using the prompt to generate the explanation on-demand. All these actions are performed behind the scenes. As an example, FIG. 11 shows a user interface 1100 including a display window 1110 which shows the explanation generated for the selected depreciation key S7GD. As shown, the content, structure, and format of the explanation are consistent with the instructions specified in the example user prompt described above.

Example Class Redefinitions for Multiple Domains

As described above, the configuration keys can be domain specific. The systems and methods disclosed herein can be used to handle configurations keys in various domains. For example, most of the system components shown in FIG. 1 can be generic for all domains, except for domain specific configuration key tables 150, domain specific input to the object extractor 130, and domain specific prompt templates 140. For example, in the domain of asset accounting, the configuration key tables 150 include a group of depreciation key tables, the input to the object extractor 130 includes domain specific definitions of root table and namespace for the depreciation key tables, the prompt templates 140 includes system and user prompts with tailored instructions for the LLM to explain depreciation keys. For other domains (e.g., payment terms, costing variants, dunning terms, etc.), the configuration key tables 150 may include domain-specific tables relevant to those domains, the input to the object extractor 130 may include domain-specific definitions of root table and namespace for these tables, and the prompt templates 140 may include system and user prompts with instructions tailored for the LLM to explain concepts specific to those domains.

In some examples, class redefinition, a feature of object-oriented programming, can be employed to customize the behavior of a class according to the specific requirements of different domains. Class redefinition allows a subclass to inherit all the features of its superclass and then add or override methods to provide domain-specific functionality. This approach promotes code reuse and flexibility, as the common features can be implemented in the superclass, while the domain-specific features can be implemented in the subclasses.

Figure 12:
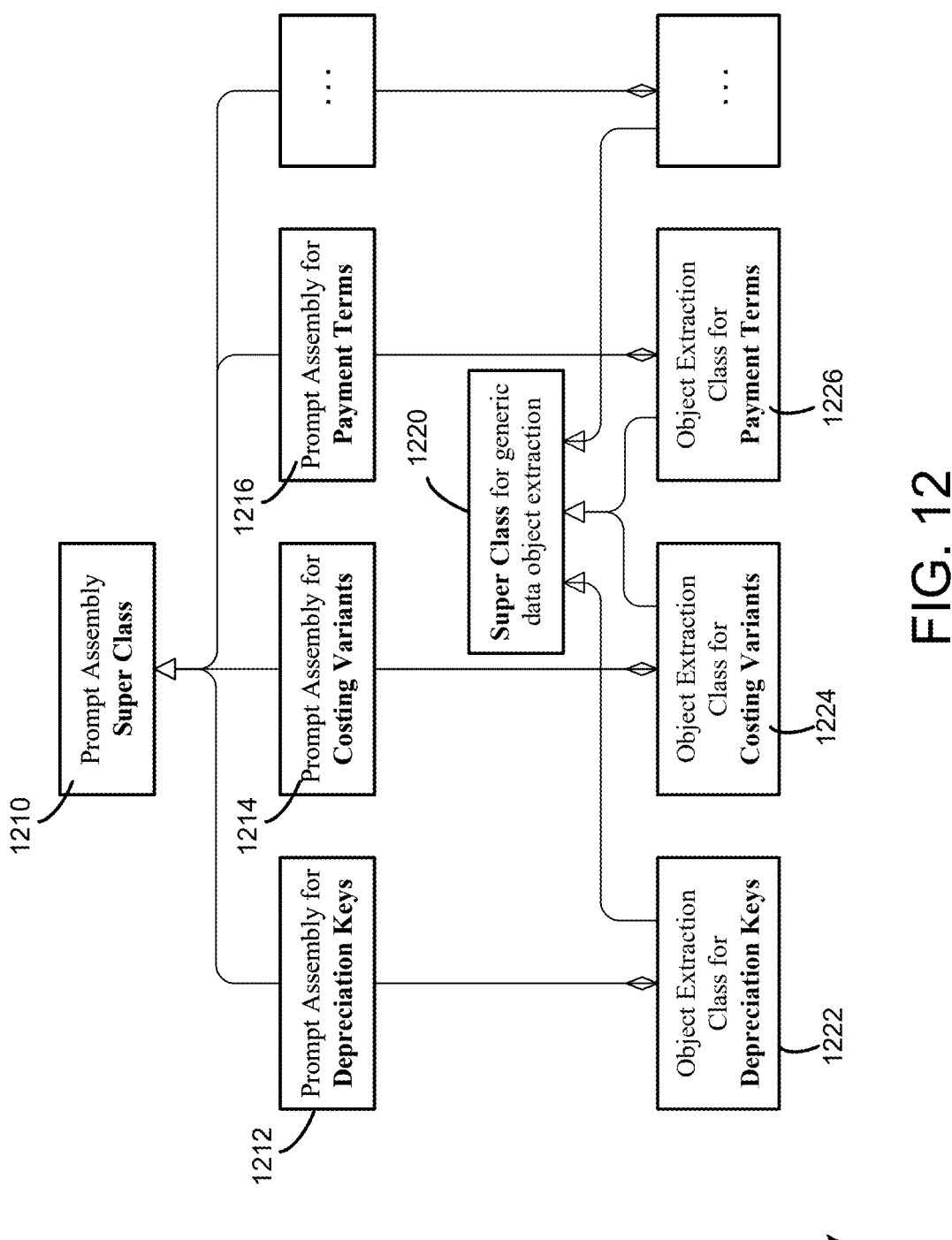
FIG. 12 is a high-level class diagram depicting redefinition of a prompt assembly class and a data object retrieval class.

For example, as illustrated in FIG. 12, the prompt assembly proxy 120 can be implemented as a prompt assembly super class 1210. This superclass can be redefined as one or more derived classes, each tailored for prompt assembly in a different domain. Examples of such derived classes include a prompt assembly for depreciation keys 1212, a prompt assembly for costing variants 1214, a prompt assembly for payment terms 1216, etc. Each derived prompt assembly class can define its own domain-specific prompt templates for generating the prompt.

Additionally, the object extractor 130 can be implemented as a super class for generic data object retrieval 1220, e.g., in JSON format. Similarly, this superclass can be redefined as one or more derived classes for object extraction in different domains, such as an object extraction class for depreciation keys 1222, an object extraction class for costing variants 1224, an object extraction class for payment terms 1226, etc. The derived object extraction classes can share the method or code for data extraction and creating the JSON object, while each derived object extraction class can receive its specific input for domain-specific definitions of root table and namespace for the configuration key tables.

This approach of using class redefinition allows the system to handle configuration keys in various domains efficiently, by leveraging the common functionality provided by the super classes and the domain-specific functionality provided by the subclasses.

Example Advantages

The technologies described herein offer several technical advantages by leveraging generative AI to provide on-demand, runtime generation of accurate and concise explanations for configuration keys in ERP systems.

First, the AI-driven approach can significantly enhance the comprehensibility of configuration keys. By generating concise explanations in natural language, it demystifies the complex rules and calculations associated with configuration keys, making them more accessible and understandable to end users. This increased comprehensibility can lead to better decision-making and more effective use of the ERP system.

Second, this approach can improve the usability of configuration keys. By providing explanations on-demand and in runtime, it eliminates the need for users to manually trace tables and rules, which can be a time-consuming and error-prone process.

Third, the intelligent generation of explanations reduces the likelihood of errors that can occur with manually generated explanations. By leveraging AI, the system can ensure a higher degree of accuracy in the explanations, thereby reducing confusion and potential errors. This can also lead to fewer support tickets, reducing the workload for the product support team and the costs associated with ticket handling.

Furthermore, the technologies disclosed herein allow flexible handling of both predefined and newly generated configuration keys. This means that even when end users or third parties add their own configuration keys, the system can still generate accurate and concise explanations for these keys. This adaptability makes the system highly versatile and capable of handling the evolving needs of organizations using ERP systems.

Example Computing Systems

Figure 13:
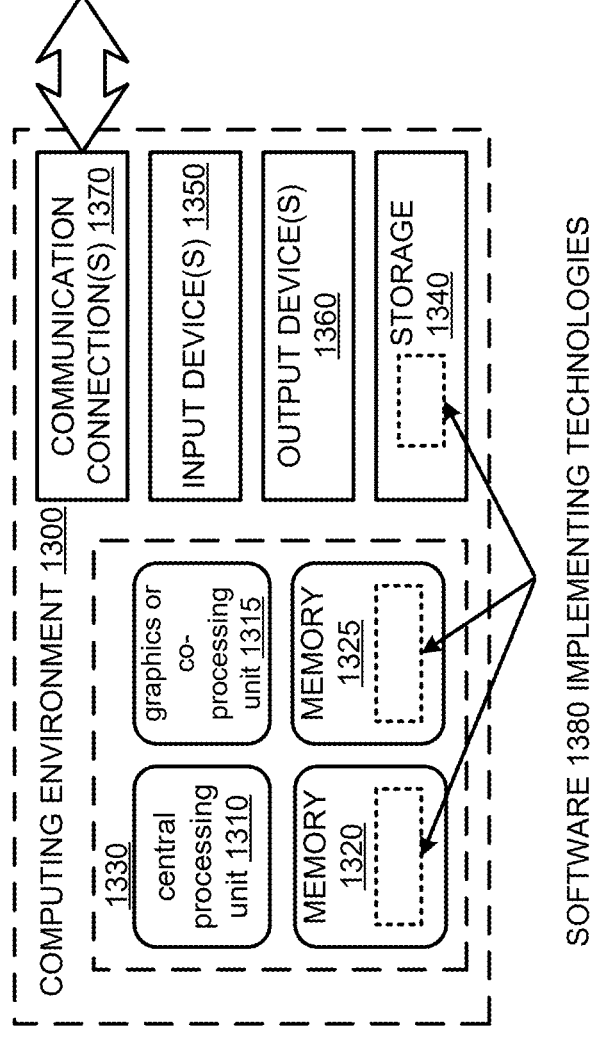
FIG. 13 is a block diagram of an example computing system in which described technologies can be implemented.

FIG. 13 depicts an example of a suitable computing system 1300 in which the described innovations can be implemented. The computing system 1300 is not intended to suggest any limitation as to scope of use or functionality of the present disclosure, as the innovations can be implemented in diverse computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 can execute computer-executable instructions, such as for implementing the features described in the examples herein (e.g., the method 200). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 13 shows a central processing unit 1310 as well as a graphics processing unit or co-processing unit 1315. The tangible memory 1320, 1325 can be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 can store software 1380 implementing one or more innovations described herein, in the form of computer-executable instructions suitable for execution by the processing unit(s) 1310, 1315.

A computing system 1300 can have additional features. For example, the computing system 1300 can include storage 1340, one or more input devices 1350, one or more output devices 1360, and one or more communication connections 1370, including input devices, output devices, and communication connections for interacting with a user. An interconnection mechanism (not shown) such as a bus, controller, or network can interconnect the components of the computing system 1300. Typically, operating system software (not shown) can provide an operating environment for other software executing in the computing system 1300, and coordinate activities of the components of the computing system 1300.

The tangible storage 1340 can be removable or non-removable, and includes magnetic disks, magnetic tapes or cassettes, CD-ROMs, DVDs, or any other medium which can be used to store information in a non-transitory way and which can be accessed within the computing system 1300. The storage 1340 can store instructions for the software implementing one or more innovations described herein.

The input device(s) 1350 can be an input device such as a keyboard, mouse, pen, or trackball, a voice input device, a scanning device, touch device (e.g., touchpad, display, or the like) or another device that provides input to the computing system 1300. The output device(s) 1360 can be a display, printer, speaker, CD-writer, or another device that provides output from the computing system 1300.

The communication connection(s) 1370 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 14:
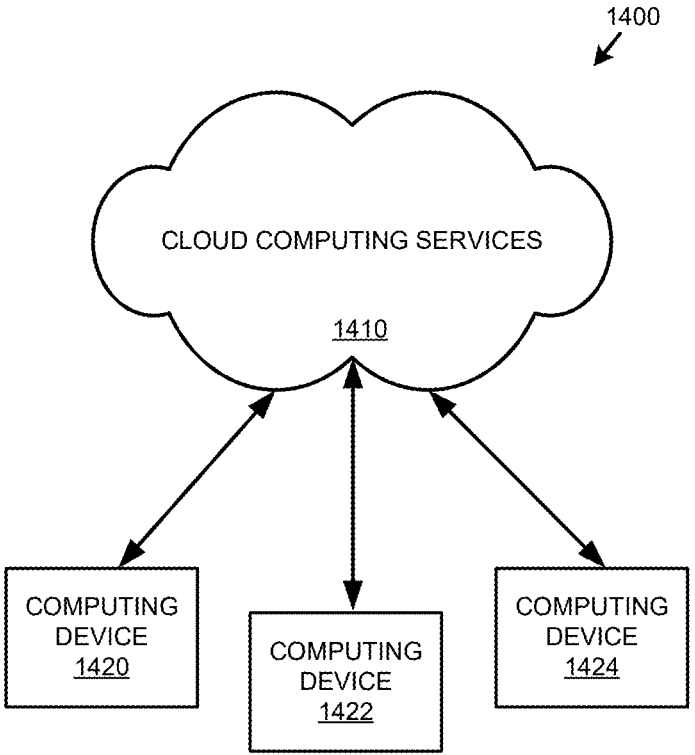
FIG. 14 is a block diagram of an example cloud computing environment that can be used in conjunction with the technologies described herein.

FIG. 14 depicts an example cloud computing environment 1400 in which the described technologies can be implemented, including, e.g., the system 100 and other systems herein. The cloud computing environment 1400 can include cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 can be utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operations (e.g., data processing, data storage, and the like).

In practice, cloud-based, on-premises-based, or hybrid scenarios can be supported.

Example Implementations

In any of the examples herein, a software application (or "application") can take the form of a single application or a suite of a plurality of applications, whether offered as a service (SaaS), in the cloud, on premises, on a desktop, mobile device, wearable, or the like.

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

In any of the examples described herein, an operation performed in runtime means that the operation can be completed in real time or with negligible processing latency (e.g., the operation can be completed within 1 second, etc.).

Example Clauses

Any of the following example clauses can be implemented.

Clause 1. A computing system with improved artificial intelligence support for enterprise resource planning (ERP), the system comprising: memory; one or more hardware processors coupled to the memory; and one or more computer readable storage media storing instructions that, when loaded into the memory, cause the one or more hardware processors to perform operations comprising: receiving, from a user interface of an ERP system, a request to explain a configuration key, wherein the configuration key represents a set of rules for controlling a process flow of an entity of the ERP system, wherein the set of rules defines a data operation scheme based on a plurality of tables stored in a database of the ERP system; generating, in runtime, a data object from the plurality of tables, wherein the data object comprises a group of key-value pairs which collectively define the set of rules; generating, in runtime, a prompt based on the data object generated from the plurality of tables; prompting, in runtime, a large language model using the prompt; receiving a response from the large language model; and outputting, on the user interface of the ERP system, an explanation of the configuration key based on the response received from the large language model, wherein the explanation of the configuration key summarizes the set of rules in natural language.

Clause 2. The computing system of clause 1, wherein the operations further comprise: storing the generated explanation of the configuration key in a temporary database; receiving, from the user interface of the ERP system, a request to explain a second configuration key, wherein the second configuration key represents a second set of rules for controlling the process flow of the entity of the ERP system, wherein the second set of rules defines a second data operation scheme based on the plurality of tables stored in the database of the ERP system; checking, in runtime, whether the temporary database stores a previously generated explanation for the second configuration key; and responding to finding the previously generated explanation for the second configuration key in the temporary database, outputting the previously generated explanation for the second configuration key on the user interface of the ERP system.

Clause 3. The computing system of clause 2, wherein the operations further comprise: responsive to receiving an update of the configuration key, removing the explanation of the configuration key from the temporary database, wherein the update of the configuration key modifies at least one rule among the set of rules for controlling the process flow of the entity of the ERP system.

Clause 4. The computing system of any one of clauses 1-3, wherein generating the data object comprises identifying a root table from the plurality of tables, wherein the root table comprises a plurality of entries, wherein at least one of the plurality of entries corresponds to the configuration key.

Clause 5. The computing system of clause 4, wherein generating the data object comprises locating, among the plurality of tables, a subset of tables containing a plurality of attributes specifically involved in the data operation scheme, wherein locating the subset of tables comprises tracing one or more foreign-key relationships confined within the plurality of tables.

Clause 6. The computing system of clause 5, wherein generating the data object comprises constructing the group of key-value pairs in a nested structure which defines a hierarchical relationship between the subset of tables.

Clause 7. The computing system of clause 6, wherein constructing the group of key-value pairs comprises obtaining text descriptions of the subset of tables from a metadata store associated with the plurality of tables.

Clause 8. The computing system of clause 7, wherein constructing the group of key-value pairs comprises obtaining data values corresponding to the plurality of attributes from the subset of tables; and pairing the data values with text descriptions of the plurality of attributes retrieved from the metadata store.

Clause 9. The computing system of any one of clauses 1-8, wherein generating the prompt comprises inserting the data object in a prompt template.

Clause 10. The computing system of any one of clauses 1-9, wherein the operations further comprise: receiving, from the user interface of the ERP system, another request to explain a difference between the configuration key and a second configuration key, wherein the second configuration key represents a second set of rules for controlling the process flow of the entity of the ERP system, wherein the second set of rules defines a second data operation scheme based on the plurality of tables stored in the database of the ERP system; generating, in runtime, a second data object from the plurality of tables, wherein the second data object comprises a second group of key-value pairs which collectively define the second set of rules; generating, in runtime, a second prompt based on the data object and the second data object generated from the plurality of tables; prompting, in runtime, the large language model using the second prompt; receiving a second response from the large language model; and outputting, on the user interface of the ERP system, an explanation of the difference between the configuration key and the second configuration key based on the second response received from the large language model, wherein the explanation of the difference summarizes differences between the set of rules and the second set of rules in natural language.

Clause 11. A computer-implemented method for improved artificial intelligence support for enterprise resource planning (ERP), the method comprising: receiving, from a user interface of an ERP system, a request to explain a configuration key, wherein the configuration key represents a set of rules for controlling a process flow of an entity of the ERP system, wherein the set of rules defines a data operation scheme based on a plurality of tables stored in a database of the ERP system; generating, in runtime, a data object from the plurality of tables, wherein the data object comprises a group of key-value pairs which collectively define the set of rules; generating, in runtime, a prompt based on the data object generated from the plurality of tables; prompting, in runtime, a large language model using the prompt; receiving a response from the large language model; and outputting, on the user interface of the ERP system, an explanation of the configuration key based on the response received from the large language model, wherein the explanation of the configuration key summarizes the set of rules in natural language.

Clause 12. The method of clause 11, further comprising: storing the generated explanation of the configuration key in a temporary database; receiving, from the user interface of the ERP system, a request to explain a second configuration key, wherein the second configuration key represents a second set of rules for controlling the process flow of the entity of the ERP system, wherein the second set of rules defines a second data operation scheme based on the plurality of tables stored in the database of the ERP system; checking, in runtime, whether the temporary database stores a previously generated explanation for the second configuration key; and responding to finding the previously generated explanation for the second configuration key in the temporary database, outputting the previously generated explanation for the second configuration key on the user interface of the ERP system.

Clause 13. The method of clause 12, further comprising: responsive to receiving an update of the configuration key, removing the explanation of the configuration key from the temporary database, wherein the update of the configuration key modifies at least one rule among the set of rules for controlling the process flow of the entity of the ERP system.

Clause 14. The method of any one of clauses 11-13, wherein generating the data object comprises identifying a root table from the plurality of tables, wherein the root table comprises a plurality of entries, wherein at least one of the plurality of entries corresponds to the configuration key.

Clause 15. The method of clause 14, wherein generating the data object comprises locating, among the plurality of tables, a subset of tables containing a plurality of attributes specifically involved in the data operation scheme, wherein locating the subset of tables comprises tracing one or more foreign-key relationships confined within the plurality of tables.

Clause 16. The method of clause 15, wherein generating the data object comprises constructing the group of key-value pairs in a nested structure which defines a hierarchical relationship between the subset of tables.

Clause 17. The method of clause 16, wherein constructing the group of key-value pairs comprises obtaining text descriptions of the subset of tables from a metadata store associated with the plurality of tables.

Clause 18. The method of clause 17, wherein constructing the group of key-value pairs comprises obtaining data values corresponding to the plurality of attributes from the subset of tables; and pairing the data values with text descriptions of the plurality of attributes retrieved from the metadata store.

Clause 19. The method of any one of clauses 11-18, wherein generating the prompt comprises inserting the data object in a prompt template.

Clause 20. One or more non-transitory computer-readable media having encoded thereon computer-executable instructions causing one or more processors to perform a method for improved artificial intelligence support for enterprise resource planning (ERP), the method comprising: receiving, from a user interface of an ERP system, a request to explain a configuration key, wherein the configuration key represents a set of rules for controlling a process flow of an entity of the ERP system, wherein the set of rules defines a data operation scheme based on a plurality of tables stored in a database of the ERP system; generating, in runtime, a data object from the plurality of tables, wherein the data object comprises a group of key-value pairs which collectively define the set of rules; generating, in runtime, a prompt based on the data object generated from the plurality of tables; prompting, in runtime, a large language model using the prompt; receiving a response from the large language model; and outputting, on the user interface of the ERP system, an explanation of the configuration key based on the response received from the large language model, wherein the explanation of the configuration key summarizes the set of rules in natural language.

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system with improved artificial intelligence support for enterprise resource planning (ERP), the system comprising:
  memory;
  one or more hardware processors coupled to the memory; and
  one or more computer readable storage media storing instructions that, when loaded into the memory, cause the one or more hardware processors to perform operations on demand comprising:

receiving, by a configuration key explaining engine, from a user interface of an ERP system, a request to explain a configuration key, wherein the configuration key represents a set of rules for controlling a process flow of an entity of the ERP system, wherein the set of rules defines a data operation scheme based on a plurality of tables stored in a database of the ERP system;

responsive to receiving the request, generating, in runtime, by an object extractor, a data object from the plurality of tables, wherein the data object comprises a group of key-value pairs which collectively define the set of rules;

generating, in runtime, by a prompt assembly proxy, a prompt based on the data object generated from the plurality of tables;

sending, in runtime, by the configuration key explaining engine, the prompt to a large language model (LLM) through an LLM proxy;

receiving a response from the LLM; and responsive to receiving the response, outputting, on the user interface of the ERP system, an explanation of the configuration key based on the response received from the LLM, wherein the explanation of the configuration key summarizes the set of rules in natural language, wherein generating the data object comprises:

identifying a root table from the plurality of tables; and locating, among the plurality of tables, a subset of tables, wherein locating the subset of tables comprises tracing one or more foreign-key relationships confined within the plurality of tables.

2. The computing system of claim 1, wherein the operations further comprise:

storing the generated explanation of the configuration key in a temporary database;

receiving, from the user interface of the ERP system, a request to explain a second configuration key, wherein the second configuration key represents a second set of rules for controlling the process flow of the entity of the ERP system, wherein the second set of rules defines a second data operation scheme based on the plurality of tables stored in the database of the ERP system;

checking, in runtime, whether the temporary database stores a previously generated explanation for the second configuration key; and responding to finding the previously generated explanation for the second configuration key in the temporary database, outputting the previously generated explanation for the second configuration key on the user interface of the ERP system.

3. The computing system of claim 2, wherein the operations further comprise:

responsive to receiving an update of the configuration key, removing the explanation of the configuration key from the temporary database, wherein the update of the configuration key modifies at least one rule among the set of rules for controlling the process flow of the entity of the ERP system.

4. The computing system of claim 1, wherein the root table comprises a plurality of entries, wherein at least one of the plurality of entries corresponds to the configuration key.

5. The computing system of claim 4, wherein the subset of tables contain a plurality of attributes specifically involved in the data operation scheme.

6. The computing system of claim 5, wherein generating the data object comprises constructing the group of key-value pairs in a nested structure which defines a hierarchical relationship between the subset of tables.

7. The computing system of claim 5, wherein constructing the group of key-value pairs comprises obtaining text descriptions of the subset of tables from a metadata store associated with the plurality of tables.

8. The computing system of claim 7, wherein constructing the group of key-value pairs comprises obtaining data values corresponding to the plurality of attributes from the subset of tables; and pairing the data values with text descriptions of the plurality of attributes retrieved from the metadata store.

9. The computing system of claim 1, wherein generating the prompt comprises inserting the data object in a prompt template.

10. The computing system of claim 1, wherein the operations further comprise:

receiving, from the user interface of the ERP system, another request to explain a difference between the configuration key and a second configuration key, wherein the second configuration key represents a second set of rules for controlling the process flow of the entity of the ERP system, wherein the second set of rules defines a second data operation scheme based on the plurality of tables stored in the database of the ERP system;

generating, in runtime, a second data object from the plurality of tables, wherein the second data object comprises a second group of key-value pairs which collectively define the second set of rules;

generating, in runtime, a second prompt based on the data object and the second data object generated from the plurality of tables;

prompting, in runtime, the LLM using the second prompt;

receiving a second response from the LLM; and outputting, on the user interface of the ERP system, an explanation of the difference between the configuration key and the second configuration key based on the second response received from the LLM, wherein the explanation of the difference summarizes differences between the set of rules and the second set of rules in natural language.

11. A computer-implemented method for improved artificial intelligence support for enterprise resource planning (ERP), the method comprising:

receiving, by a configuration key explaining engine, from a user interface of an ERP system, a request to explain a configuration key, wherein the configuration key represents a set of rules for controlling a process flow of an entity of the ERP system, wherein the set of rules defines a data operation scheme based on a plurality of tables stored in a database of the ERP system;

responsive to receiving the request, generating, in runtime, by an object extractor, a data object from the plurality of tables, wherein the data object comprises a group of key-value pairs which collectively define the set of rules;

generating, in runtime, by a prompt assembly proxy, a prompt based on the data object generated from the plurality of tables;

sending, in runtime, by the configuration key explaining engine, the prompt to a large language model (LLM) through an LLM proxy;

receiving a response from the LLM; and responsive to receiving the response, outputting, on the user interface of the ERP system, an explanation of the configuration key based on the response received from the LLM, wherein the explanation of the configuration key summarizes the set of rules in natural language, wherein generating the data object comprises:

identifying a root table from the plurality of tables; and locating, among the plurality of tables, a subset of tables, wherein locating the subset of tables comprises tracing one or more foreign-key relationships confined within the plurality of tables.

12. The method of claim 11, further comprising:

storing the generated explanation of the configuration key in a temporary database;

receiving, from the user interface of the ERP system, a request to explain a second configuration key, wherein the second configuration key represents a second set of rules for controlling the process flow of the entity of the ERP system, wherein the second set of rules defines a second data operation scheme based on the plurality of tables stored in the database of the ERP system;

checking, in runtime, whether the temporary database stores a previously generated explanation for the second configuration key; and responding to finding the previously generated explanation for the second configuration key in the temporary database, outputting the previously generated explanation for the second configuration key on the user interface of the ERP system.

13. The method of claim 12, further comprising:

responsive to receiving an update of the configuration key, removing the explanation of the configuration key from the temporary database, wherein the update of the configuration key modifies at least one rule among the set of rules for controlling the process flow of the entity of the ERP system.

14. The method of claim 11, wherein the root table comprises a plurality of entries, wherein at least one of the plurality of entries corresponds to the configuration key.

15. The method of claim 14, wherein the subset of tables containing a plurality of attributes specifically involved in the data operation scheme.

16. The method of claim 15, wherein generating the data object comprises constructing the group of key-value pairs in a nested structure which defines a hierarchical relationship between the subset of tables.

17. The method of claim 16, wherein constructing the group of key-value pairs comprises obtaining text descriptions of the subset of tables from a metadata store associated with the plurality of tables.

18. The method of claim 17, wherein constructing the group of key-value pairs comprises obtaining data values corresponding to the plurality of attributes from the subset of tables; and pairing the data values with text descriptions of the plurality of attributes retrieved from the metadata store.

19. The method of claim 11, wherein generating the prompt comprises inserting the data object in a prompt template.

20. One or more non-transitory computer-readable media having encoded thereon computer-executable instructions causing one or more processors to perform a method for improved artificial intelligence support for enterprise resource planning (ERP), the method comprising:

receiving, by a configuration key explaining engine, from a user interface of an ERP system, a request to explain a configuration key, wherein the configuration key represents a set of rules for controlling a process flow of an entity of the ERP system, wherein the set of rules defines a data operation scheme based on a plurality of tables stored in a database of the ERP system;

responsive to receiving the request, generating, in runtime, by an object extractor, a data object from the plurality of tables, wherein the data object comprises a group of key-value pairs which collectively define the set of rules;

generating, in runtime, by a prompt assembly proxy, a prompt based on the data object generated from the plurality of tables;

sending, in runtime, by the configuration key explaining engine, the prompt to a large language model (LLM) through an LLM proxy;

receiving a response from the LLM; and responsive to receiving the response, outputting, on the user interface of the ERP system, an explanation of the configuration key based on the response received from the LLM, wherein the explanation of the configuration key summarizes the set of rules in natural language, wherein generating the data object comprises:

identifying a root table from the plurality of tables; and locating, among the plurality of tables, a subset of tables, wherein locating the subset of tables comprises tracing one or more foreign-key relationships confined within the plurality of tables.

* * * * *